(12) United States Patent
Boon et al.

(10) Patent No.: US 12,220,963 B2
(45) Date of Patent: Feb. 11, 2025

(54) MODULAR LOAD DISTRIBUTION UNIT AND ASSEMBLY METHOD

(71) Applicant: DRIV Automotive Inc., Northville, MI (US)

(72) Inventors: Peter Boon, Merchtem (BE); Tom Daniels, Testelt (BE); Paolo Diomedi, Brussels (BE); Peter Maex, Antwerp (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 18/302,382

(22) Filed: Apr. 18, 2023

(65) Prior Publication Data

US 2024/0351392 A1 Oct. 24, 2024

(51) Int. Cl.
| | |
|---|---|
| *B60G 17/08* | (2006.01) |
| *B60G 13/08* | (2006.01) |
| *B60G 21/073* | (2006.01) |

(52) U.S. Cl.
CPC ............ *B60G 17/08* (2013.01); *B60G 13/08* (2013.01); *B60G 2202/24* (2013.01); *B60G 2800/012* (2013.01); *B60G 2800/014* (2013.01)

(58) Field of Classification Search
CPC .... B60G 17/08; B60G 13/08; B60G 2202/24; B60G 2800/012; B60G 2800/014; B60G 21/067; B60G 21/073; B60G 2204/8102; B60G 2204/8304; F16F 9/20
See application file for complete search history.

(56) References Cited

U.S. PATENT DOCUMENTS

| | | | |
|---|---|---|---|
| 5,447,332 A | 9/1995 | Heyring | |
| 5,601,307 A | 2/1997 | Heyring et al. | |
| 6,213,485 B1 * | 4/2001 | Doll | B60G 17/0408 280/124.16 |
| 6,270,098 B1 | 8/2001 | Heyring et al. | |
| 7,611,152 B2 * | 11/2009 | van der Knaap | B60G 17/056 280/124.16 |

(Continued)

FOREIGN PATENT DOCUMENTS

| | | |
|---|---|---|
| CN | 1771141 A | 5/2006 |
| FR | 2907377 A1 | 4/2008 |

(Continued)

*Primary Examiner* — Thomas W Irvin
(74) *Attorney, Agent, or Firm* — Harness, Dickey & Pierce, P.L.C.

(57) ABSTRACT

A suspension system including hydraulic circuits that extend between dampers located at opposite corners of the vehicle and at least one load distribution unit that is connected in fluid communication with at least two hydraulic circuits. The load distribution unit includes a manifold block with a cylinder bore, a pair of pressure tubes, a piston rod assembly, and an integral rod guide and pressure tube coupler. The pressure tubes are partially received in the cylinder bore to define a pair of opposed cylinders and mate with the integral rod guide and pressure tube coupler. The piston rod assembly includes a piston rod and a pair of opposed pistons that are slidingly received within the opposed cylinders. In addition to retaining the pressure tubes, the integral rod guide and pressure tube coupler supports and permits the piston rod to slide longitudinally relative to the manifold block.

20 Claims, 14 Drawing Sheets

(56) References Cited

U.S. PATENT DOCUMENTS

| | | | |
|---|---|---|---|
| 8,123,235 B2* | 2/2012 | Monk | B60G 21/06 |
| | | | 280/124.161 |
| 8,544,863 B2* | 10/2013 | Revill | B60G 21/06 |
| | | | 280/124.16 |
| 11,590,819 B2 | 2/2023 | Letizio et al. | |
| 11,691,474 B2* | 7/2023 | Boon | B67D 7/02 |
| | | | 141/1 |
| 11,697,319 B2* | 7/2023 | Vandersmissen | B60G 17/016 |
| | | | 280/5.514 |
| 11,865,887 B2* | 1/2024 | Boon | B60G 17/0152 |
| 11,865,889 B2* | 1/2024 | Vandersmissen | B60G 17/08 |
| 11,912,092 B2* | 2/2024 | Vandersmissen | G01M 13/003 |
| 11,919,355 B2* | 3/2024 | Calchand | G01M 13/003 |
| 11,938,772 B2* | 3/2024 | Vandersmissen | B60G 17/0152 |
| 12,059,937 B2* | 8/2024 | Boon | B60G 21/103 |
| 12,083,848 B1 | 9/2024 | Dhaens et al. | |
| 12,083,851 B1 | 9/2024 | Dhaens et al. | |
| 12,097,739 B2* | 9/2024 | Calchand | B60G 17/044 |
| 2005/0001401 A1 | 1/2005 | Heyring et al. | |
| 2005/0133978 A1 | 6/2005 | Lemmens | |
| 2005/0225050 A1 | 10/2005 | Mizuno | |
| 2006/0151969 A1* | 7/2006 | Revill | B60G 17/056 |
| | | | 280/124.162 |
| 2007/0138756 A1* | 6/2007 | Fontdecaba Buj | B60G 21/10 |
| | | | 280/124.16 |
| 2007/0170680 A1* | 7/2007 | Knaap | B60G 17/056 |
| | | | 280/124.106 |
| 2008/0272561 A1* | 11/2008 | Monk | B60G 21/06 |
| | | | 280/124.16 |
| 2013/0319804 A1* | 12/2013 | Six | F16F 9/26 |
| | | | 188/297 |
| 2017/0240019 A1* | 8/2017 | Six | B60G 17/0416 |
| 2020/0324603 A1 | 10/2020 | Ohno et al. | |
| 2021/0003190 A1 | 1/2021 | Deferme | |
| 2023/0011377 A1 | 1/2023 | Niu et al. | |
| 2023/0109741 A1* | 4/2023 | Vandersmissen | B60G 21/067 |
| | | | 280/124.161 |
| 2023/0111759 A1* | 4/2023 | Vandersmissen | B60G 17/056 |
| | | | 280/5.514 |
| 2023/0111977 A1* | 4/2023 | Boon | B60G 17/01908 |
| | | | 701/37 |
| 2023/0114717 A1* | 4/2023 | Boon | B60G 21/073 |
| | | | 701/37 |
| 2024/0317007 A1* | 9/2024 | Henderickx | B60G 17/016 |

FOREIGN PATENT DOCUMENTS

| | | |
|---|---|---|
| JP | 2005351380 A | 12/2005 |
| JP | 4674882 B2 | 4/2011 |
| KR | 20110094937 A | 8/2011 |

\* cited by examiner

MODULAR LOAD DISTRIBUTION UNIT AND ASSEMBLY METHOD

FIELD

The present disclosure relates generally to vehicle suspension systems and more particularly to load distribution manifold assemblies that are used to control roll and/or pitch movements of a vehicle by controlling fluid flow and pressure within an adaptive suspension system.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during corning (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning). Such mechanical systems cannot be easily switched off or cancelled out when roll stiffness is not need. Some vehicles do have stabilizer bar/anti-roll bar disconnects that may be manually or electronically actuated, but the complexity and cost associated with these systems make them ill-suited for most vehicle applications.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll stiffness of the suspension system of the vehicle. However, the downside of such systems is that ride comfort is more difficult to achieve because bump forces can be transmitted from one damper to another damper across the hydraulic circuit resulting in unwanted suspension movement. Accordingly, there remains a need for improved vehicle suspension systems that can minimize roll while maintaining acceptable levels of ride comfort.

The present disclosure is directed to load distribution units, which are manifold assemblies that are connected to the hydraulic lines that run between the multiple dampers in the suspension system. The load distribution unit includes multiple electro-mechanical valves and accumulators that are used/actuated to control fluid flow and pressure within the hydraulic lines of the suspension system to selectively and dynamically provide resistance to roll and/or pitch movements of the vehicle.

SUMMARY

This section provides a general summary of the disclosure and is not a comprehensive disclosure of its full scope or all of its features.

In accordance with one aspect of the subject disclosure, a suspension system is provided that includes a plurality of dampers, which are described herein as a front left damper, a front right damper, a back left damper, and a back right damper. The front left damper includes a first compression chamber and a first rebound chamber. The front right damper includes a second compression chamber and a second rebound chamber. The back left damper includes a third compression chamber and a third rebound chamber. The back right damper includes a fourth compression chamber and a fourth rebound chamber. The suspension system of the present disclosure also includes a plurality of hydraulic circuits, which are described herein as a first hydraulic circuit, a second hydraulic circuit, a third hydraulic circuit, and a fourth hydraulic circuit.

The first hydraulic circuit extends between and fluidly connects the first compression chamber of the front left damper and the fourth rebound chamber of the back right damper. The second hydraulic circuit extends between and fluidly connects the second compression chamber of the front right damper and the third rebound chamber of the back left damper. The third hydraulic circuit extends between and fluidly connects the first rebound chamber of the front left damper and the fourth compression chamber of the back right damper. Finally, the fourth hydraulic circuit extends between and fluidly connects the second rebound chamber of the front right damper and the third compression chamber of the back left damper. Thus, it should be appreciated that the first and third hydraulic circuits include hydraulic lines that physically cross over hydraulic lines of the second and fourth hydraulic circuits and/or include hydraulic conduits within a manifold block that cross over one another.

The suspension system also includes at least one load distribution unit that is arranged in fluid communication with at least two out of the four hydraulic circuits described above. For example, the suspension system may include one load distribution unit that is arranged in fluid communication with all four hydraulic circuits. Alternatively, the suspension system could include a pair of split load distribution units where a first split load distribution unit is arranged in fluid communication with two of the hydraulic circuits and a second split load distribution unit is arranged in fluid communication with the other two hydraulic circuits.

Regardless of the configuration, the load distribution unit includes a manifold block with a first cylinder bore, a first pair of pressure tubes, a first piston rod assembly, and a first integral rod guide and pressure tube coupler. The first pair of pressure tubes are at least partially received in the first cylinder bore on opposing sides of the manifold block to define a first pair of opposed cylinders. The first piston rod assembly includes a first piston rod and a first pair of opposed pistons that are mounted on the first piston rod. The first pair of opposed pistons are slidingly received within the first pair of opposed cylinders. The first integral rod guide and pressure tube coupler is received in the first cylinder bore in the manifold block and includes a first through-bore. The first piston rod extends through the first through-bore in the first integral rod guide and pressure tube coupler in a sliding fit. The first pair of pressure tubes extends longitudinally between a first pair of inboard pressure tube ends and a first pair of outboard pressure tube ends. The first pair of inboard pressure tube ends are received in the first cylinder bore and are retained on opposing ends of the first integral rod guide and pressure tube coupler, which holds the first pair of pressure tubes and the first rod guide assembly together as part of a first modular pressure tube and piston subassembly.

In accordance with another aspect of the present disclosure, a load distribution unit for regulating hydraulic pressure within a suspension system is provided. The load distribution unit includes a manifold block with a first cylinder bore that extends longitudinally through the manifold block. A first pair of pressure tubes are at least partially received in the first cylinder bore on opposing sides of the manifold block to define the first pair of opposed cylinders. The first pair of pressure tubes extend longitudinally between a first pair of inboard pressure tube ends and a first pair of outboard pressure tube ends. The load distribution unit includes a first piston rod assembly with a first piston rod and a first pair of opposed pistons that are mounted on the first piston rod. The first pair of opposed pistons are slidingly received within the first pair of opposed cylinders. The load distribution unit also includes a first integral rod guide and pressure tube coupler that is received in the first cylinder bore in the manifold block and includes a first through-bore. The first piston rod extends through the first through-bore in the first integral rod guide and pressure tube coupler in a sliding fit. The first pair of inboard pressure tube ends are received in the first cylinder bore and are retained on opposing ends of the first integral rod guide and pressure tube coupler, which holds the first pair of pressure tubes and the first rod guide assembly together as part of a first modular pressure tube and piston subassembly.

In accordance with another aspect of the present disclosure, a method of assembling the load distribution unit described above is provided. The method comprises the steps of: inserting a piston rod through a through-bore in a integral rod guide and pressure tube coupler, positioning a pair of opposed piston springs in a co-axially arrangement over the first piston rod such that the pair of opposed piston springs abut opposing ends of the integral rod guide and pressure tube coupler, and mounting a pair of opposed pistons on opposite ends of the piston rod. The method proceeds with the step of longitudinally sliding a pair of pressure tubes over the pair of opposed pistons until the inboard pressure tube ends abut and mate with the opposing ends of the integral rod guide and pressure tube coupler to form a first modular pressure tube and piston subassembly. The method then includes the step of longitudinally sliding the first modular pressure tube and piston subassembly into a first cylinder bore in a manifold block until the integral rod guide and pressure tube coupler is positioned inside the first cylinder bore and at least portions of the pair of pressure tubes extend longitudinally out away from opposing sides of the manifold block.

Advantageously, the load distribution unit described above is configured to regulate hydraulic pressure within the hydraulic circuits and is therefore able to reduce/eliminate vehicle roll while cornering and vehicle pitch during acceleration and braking for improved grip, performance, handling, and braking. The reduction of roll and pitch angles improves the comfort, steering feel, agility, and stability of the vehicle. Roll and pitch control is provided by increasing the roll and pitch stiffness of the suspension system (based on static pressure in the system). The level of roll and pitch stiffness can be adjusted by changing the static pressure in select hydraulic circuits of the suspension system. Comfort is also improved because the anti-roll and anti-pitch forces applied by the load distribution unit are independent of the damping forces.

It should be appreciated that the load distribution unit described above has a modular arrangement/construction that enables the load distribution unit to be easily manufactured and assembled in a series of standalone subassemblies. In particular, the integral rod guide and pressure tube coupler is used to support the first piston rod and interconnected/couple the first pair of pressure tubes and therefore allows the first piston rod assembly and the first pair of pressure tubes to be pre-assembled to form the first modular pressure tube and piston subassembly prior to installation/insertion into the first cylinder bore in the manifold block. This provides a better and more economical way of constructing the load distribution unit.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
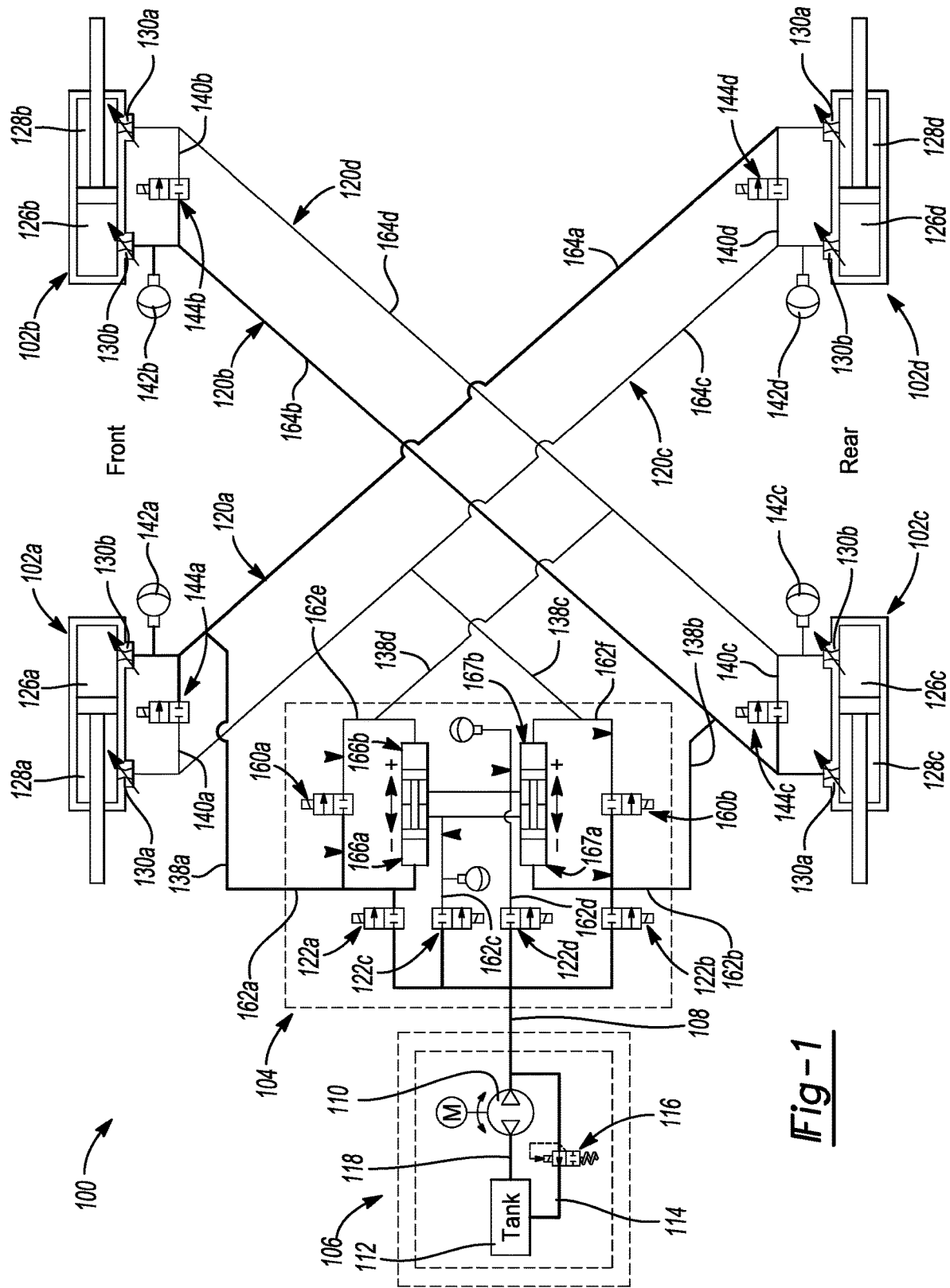
FIG. 1 is a schematic diagram illustrating an exemplary suspension system of the present disclosure that includes four hydraulic circuits connecting the front and rear dampers and an exemplary load distribution unit.

Referring to the Figures, wherein like numerals indicate corresponding parts throughout the several views, various suspension control systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a suspension system 100 for a vehicle is illustrated with a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of the vehicle to control vertical movements of the front and rear wheels of the vehicle. Thus, the front left damper 102a controls (e.g., dampens) up and down (i.e., vertical) movements of the front left wheel of the vehicle, the front right damper 102b controls (e.g., dampens) up and down (i.e., vertical) movements of the front right wheel of the vehicle, the back left damper 102c controls (e.g., dampens) up and down (i.e., vertical) movements of the back left wheel of the vehicle, and the back right damper 102d controls (e.g., dampens) up and down (i.e., vertical) movements of the back right wheel of the vehicle.

Each of the dampers 102a, 102b, 102c, 102d of the suspension system 100 includes a damper housing, a piston rod, and a piston that is mounted on the piston rod. The piston is arranged in sliding engagement with the inside of the damper housing such that the piston divides the damper housing into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 128c, and the back right damper 102d includes a fourth compression chamber 126d and a fourth rebound chamber 128d.

In each damper 102a, 102b, 102c, 102d, the piston is a closed piston with no fluid flow paths defined within or by its structure. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. The compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

Each damper 102a, 102b, 102c, 102d also includes rebound and compression chamber ports 130a, 130b in the damper housing that are each provided with dampening valves. The rebound chamber port 130a is arranged in fluid communication with the rebound chamber 128a, 128b, 128c, 128d of the damper 102a, 102b, 102c, 102d and the second port 130b is arranged in fluid communication with the compression chamber 126a, 126b, 126c, 126d of the damper 102a, 102b, 102c, 102d. The dampening valves in the rebound and compression chamber ports 130a, 130b can be passive/spring-biased valves (e.g., spring-disc stacks) or active valves (e.g., electromechanical valves) and control fluid flow into and out of the compression and rebound chambers of the dampers 102a, 102b, 102c, 102d to provide one or more rebound dampening rates and compression dampening rates for each of the dampers 102a, 102b, 102c, 102d.

The suspension system 100 also includes a load distribution unit 104 that is connected in fluid communication with a pump assembly 106 by a pump hydraulic line 108. The pump assembly 106 includes a bi-directional pump 110, a hydraulic reservoir 112 (e.g., a tank), and a bypass hydraulic line 114 that can be open and closed by a pressure relief valve 116. The load distribution unit 104 is connected in fluid communication with the front and rear dampers 102a, 102b, 102c, 102d by four hydraulic circuits 120a, 120b, 120c, 120d: a first hydraulic circuit 120a, a second hydraulic circuit 120b, a third hydraulic circuit 120c, and a fourth hydraulic circuit 120d.

The load distribution unit 104 is constructed and operates as a manifold assembly that controls/regulates fluid flow and pressure within the four hydraulic circuits 120a, 120b, 120c, 120d. The load distribution unit 104 includes four seat valves 122a, 122b, 122c, 122d (a first seat valve 122a, a second seat valve 122b, a third seat valve 122c, and a fourth seat valve 122d) that are connected in parallel with the pump hydraulic line 108. The load distribution unit 104 further includes a first comfort valve 160a, a second comfort valve 160b, and six manifold passageways 162a, 162b, 162c, 162d, 162e, 162f: a first manifold passageway 162a, a second manifold passageway 162b, a third manifold passageway 162c, a fourth manifold passageway 162d, a fifth manifold passageway 162e, and a sixth manifold passageway 162f. The first manifold passageway 162a is connected in fluid communication with the first seat valve 122a and the first comfort valve 160a while the second manifold passageway 162b is connected in fluid communication with the second seat valve 122b and the second comfort valve 160b. The third manifold passageway 162c is connected in fluid communication with the third seat valve 122c and the fourth manifold passageway 162d is connected in fluid communication with the fourth seat valve 122d. The fifth manifold passageway 162e is connected in fluid communication with the first comfort valve 160a and the sixth manifold passageway 162f is connected in fluid communication with the second comfort valve 160b. Additional structure and operational details of the load distribution unit 104 is described below in connection with FIG. 2; however, it should be appreciated from FIG. 1 that the load distribution unit 104 regulates/controls fluid pressure in the four hydraulic circuits 120a, 120b, 120c, 120d, which dynamically adjusts the roll and pitch stiffness of the vehicle and can be used to either augment or completely replace mechanical stabilizer bars/anti-roll bars. Such mechanical systems require relatively straight, unobstructed runs between each of the front dampers 102a, 102b and each of the back dampers 102c, 102d. Accordingly, the suspension system 100 disclosed herein offers packaging benefits because the dampers 102a, 102b, 102c, 102d only need to be hydraulically connected to the load distribution unit 104.

The first hydraulic circuit 120a includes a first cross-over hydraulic line 164a that extends between and fluidly connects the compression chamber port 130b (to the first compression chamber 126a) of the front left damper 102a and the rebound chamber port 130a (to the fourth rebound chamber 128d) of the back right damper 102d. The first hydraulic circuit 120a also includes a first manifold hydraulic line 138a that extends between and fluidly connects the first cross-over hydraulic line 164a and the first manifold passageway 162a. The second hydraulic circuit 120b includes a second cross-over hydraulic line 164b that extends between and fluidly connects the compression chamber port 130b (to the second compression chamber 126b) of the front right damper 102b and the rebound chamber port 130a (to the third rebound chamber 128c) of the back left damper 102c. The second hydraulic circuit 120b also includes a second manifold hydraulic line 138b that extends between and fluidly connects the second cross-over hydraulic line 164b and the second manifold passageway 162b. The third hydraulic circuit 120c includes a third cross-over hydraulic line 164c that extends between and fluidly connects the rebound chamber port 130a (to the first rebound chamber 128a) of the front left damper 102a and the compression chamber port 130b (to the fourth compression chamber 126d) of the back right damper 102d. The third hydraulic circuit 120c also includes a third manifold hydraulic line 138c that extends between and fluidly connects the third cross-over hydraulic line 164c and the sixth manifold passageway 162f. The fourth hydraulic circuit 120d includes a fourth cross-over hydraulic line 164d that extends between and fluidly connects the rebound chamber port 130a (to the second rebound chamber 128b) of the front right damper 102b and the compression chamber port 130b (to the third compression chamber 126c) of the back left damper 102c. The fourth hydraulic circuit 120d also includes a fourth manifold hydraulic line 138d that extends between and fluidly connects the fourth cross-over hydraulic line 164d and the fifth manifold passageway 162e. It should be appreciated that the word "cross-over" as used in the first, second, third, and fourth cross-over hydraulic lines 164a, 164b, 164c, 164d simply means that the first, second, third, and fourth cross-over hydraulic lines 164a, 164b, 164c, 164d run between dampers 102a, 102b, 102c, 102d at opposite corners of the vehicle (e.g., front left to back right and front right to back left). The first, second, third, and fourth cross-over hydraulic lines 164a, 164b, 164c, 164d need not be linear or arranged in any particular direction as long as they ultimately connect dampers 102a, 102b, 102c, 102d positioned at opposite corners of the vehicle.

The suspension system 100 also includes four bridge hydraulic lines 140a, 140b, 140c, 140d that fluidly couple the first and third hydraulic circuits 120a, 120c and the second and fourth hydraulic circuits 120b, 120d to one another. The four bridge hydraulic lines 140a, 140b, 140c, 140d include a front left bridge hydraulic line 140a that extends between and fluidly connects the first cross-over hydraulic line 164a and the third cross-over hydraulic line 164c, a front right bridge hydraulic line 140b that extends between and fluidly connects the second cross-over hydraulic line 164b and the fourth cross-over hydraulic line 164d, a back left bridge hydraulic line 140c that extends between and fluidly connects the second cross-over hydraulic line 164*b* and the fourth cross-over hydraulic line 164*d*, and a back right bridge hydraulic line 140*d* that extends between and fluidly connects the first cross-over hydraulic line 164*a* and the third cross-over hydraulic line 164*c*.

The front left bridge hydraulic line 140*a* is connected to the first cross-over hydraulic line 164*a* between the compression chamber port 130*b* of the front left damper 102*a* and the first manifold hydraulic line 138*a* and is connected to the third cross-over hydraulic line 164*c* between the rebound chamber port 130*a* of the front left damper 102*a* and the third manifold hydraulic line 138*c*. The front right bridge hydraulic line 140*b* is connected to the second cross-over hydraulic line 164*b* between the compression chamber port 130*b* of the front right damper 102*b* and the second manifold hydraulic line 138*b* and is connected to the fourth cross-over hydraulic line 164*d* between the rebound chamber port 130*a* of the front right damper 102*b* and the fourth manifold hydraulic line 138*d*. The back left bridge hydraulic line 140*c* is connected to the second cross-over hydraulic line 164*b* between the rebound chamber port 130*a* of the back left damper 102*c* and the second manifold hydraulic line 138*b* and is connected to the fourth cross-over hydraulic line 164*d* between the compression chamber port 130*b* of the back left damper 102*c* and the fourth manifold hydraulic line 138*d*. The back right bridge hydraulic line 140*d* is connected to the first cross-over hydraulic line 164*a* between the rebound chamber port 130*a* of the back right damper 102*d* and the first manifold hydraulic line 138*a* and is connected to the third cross-over hydraulic line 164*c* between the compression chamber port 130*b* of the back right damper 102*d* and the third manifold hydraulic line 138*c*.

A front left accumulator 142*a* is arranged in fluid communication with the first cross-over hydraulic line 164*a* at a location between the compression chamber port 130*b* of the front left damper 102*a* and the front left bridge hydraulic line 140*a*. A front right accumulator 142*b* is arranged in fluid communication with the second cross-over hydraulic line 164*b* at a location between the compression chamber port 130*b* of the front right damper 102*b* and the front right bridge hydraulic line 140*b*. A back left accumulator 142*c* is arranged in fluid communication with the fourth cross-over hydraulic line 164*d* at a location between the compression chamber port 130*b* of the back left damper 102*c* and the back left bridge hydraulic circuit 120*c*. A back right accumulator 142*d* is arranged in fluid communication with the third cross-over hydraulic line 164*c* at a location between the compression chamber port 130*b* of the back right damper 102*d* and the back right bridge hydraulic line 140*d*. Each of the accumulators 142*a*, 142*b*, 142*c*, 142*d* have a variable fluid volume that increases and decreases depending on the fluid pressure in the cross-over hydraulic lines 164*a*, 164*b*, 164*c*, 164*d*. It should be appreciated that the accumulators 142*a*, 142*b*, 142*c*, 142*d* may be constructed in a number of different ways. For example and without limitation, the accumulators 142*a*, 142*b*, 142*c*, 142*d* may have accumulation chambers and pressurized gas chambers that are separated by floating pistons, flexible membranes, or bellows.

The suspension system 100 also includes four electro-mechanical comfort valves 144*a*, 144*b*, 144*c*, 144*d* that are connected in-line (i.e., in series) with each of the bridge hydraulic lines 140*a*, 140*b*, 140*c*, 140*d*. A front left comfort valve 144*a* is positioned in the front left bridge hydraulic line 140*a*. A front right comfort valve 144*b* is positioned in the front right bridge hydraulic line 140*b*. A back left comfort valve 144*c* is positioned in the back left bridge hydraulic line 140*c*. A back right comfort valve 144*d* is positioned in the back right bridge hydraulic line 140*d*. In the illustrated example, the four comfort valves 144*a*, 144*b*, 144*c*, 144*d* adjacent to the dampers 102*a*, 102*b*, 102*c*, 102*d* and the two comfort valves 160*a*, 160*b* located on the load distribution unit 104 are semi-active electro-mechanical valves with a combination of passive spring-disk elements and a solenoid. The four comfort valves 144*a*, 144*b*, 144*c*, 144*d* adjacent to the dampers 102*a*, 102*b*, 102*c*, 102*d* and the two comfort valves 160*a*, 160*b* located on the load distribution unit 104 are electronically connected to the controller, which is configured to supply electrical current to the solenoids of the four comfort valves 144*a*, 144*b*, 144*c*, 144*d* adjacent to the dampers 102*a*, 102*b*, 102*c*, 102*d* and the two comfort valves 160*a*, 160*b* located on the load distribution unit 104 to selectively and individually open and close the four comfort valves 144*a*, 144*b*, 144*c*, 144*d* adjacent to the dampers 102*a*, 102*b*, 102*c*, 102*d* and the two comfort valves 160*a*, 160*b* located on the load distribution unit 104.

When the seat valves 122*a*, 122*b*, 122*c*, 122*d* are closed, the hydraulic circuits 120*a*, 120*b*, 120*c*, 120*d* operate as a closed loop system, either together or separately depending on the open or closed status of the four comfort valves 144*a*, 144*b*, 144*c*, 144*d* adjacent to the dampers 102*a*, 102*b*, 102*c*, 102*d* and the two comfort valves 160*a*, 160*b* located on the load distribution unit 104. When the seat valves 122*a*, 122*b*, 122*c*, 122*d* are open, the bi-directional pump 110 either adds or removes fluid from one or more of the hydraulic circuits 120*a*, 120*b*, 120*c*, 120*d*. There are three primary types of suspension movements that the illustrated suspension system 100 can control either passively (i.e., as a closed loop system) or actively (i.e., as an open loop system) by changing or adapting the roll and/or pitch stiffness of the vehicle: leaning to one side or the other during cornering (i.e., roll) pitching forward during braking (i.e., brake dive), and pitching aft during acceleration (i.e., rear end squat). Descriptions of how the suspension system 100 reacts to each of these conditions are provided below.

When the vehicle is put into a right-hand turn, the momentum of the sprung weight of the vehicle tends to make the vehicle lean left towards the outside of the turn, compressing the front left damper 102*a* and the back left damper 102*c*. When this occurs, fluid flows out from the first compression chamber 126*a* of the front left damper 102*a* and the third compression chamber 126*c* of the back left damper 102*c* into the first and fourth cross-over hydraulic lines 164*a*, 164*d*. As a result of the weight transfer to the left side of the vehicle, the front right damper 102*b* and back right damper 102*d* begin to extend, causing fluid to flow out of the second rebound chamber 128*b* of the front right damper 102*b* and the fourth rebound chamber 128*d* of the back right damper 102*d* into the first and fourth cross-over hydraulic lines 164*a*, 164*d*. When the four comfort valves 144*a*, 144*b*, 144*c*, 144*d* adjacent to the dampers 102*a*, 102*b*, 102*c*, 102*d* are closed, the fluid flow out of the first compression chamber 126*a* of the front left damper 102*a*, out of the third compression chamber 126*c* of the back left damper 102*c*, out of the second rebound chamber 128*b* of the front right damper 102*b*, and out of the fourth rebound chamber 128*d* of the back right damper 102*d* and into the first and fourth cross-over hydraulic lines 164*a*, 164*d* increases the pressure in the front left and back left accumulators 142*a*, 142*c*, thus providing a passive roll resistance where it becomes increasingly more difficult to compress the front left damper 102*a* and the back left damper 102*c* since the first compression chamber 126*a* of the front left damper 102*a* and the third compression chamber 126*c* of the back left damper 102c are connected in fluid communication with the first and fourth hydraulic circuits 120a, 120d. At the same time, fluid flows out of front right and back right accumulators 142b, 142d and into the first rebound chamber 128a of the front left damper 102a, into the third rebound chamber 128c of the back left damper 102c, into the second compression chamber 126b of the front right damper 102b, and into the fourth compression chamber 126d of the back right damper 102d. The resulting pressure difference between the dampers 102a, 102b, 102c, 102d generates damper forces that counteract or resist the roll moment of the vehicle. Additional roll resistance can be added by opening the first seat valve 122a and the first comfort valve 160a as the bi-directional pump 110 is running in a first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the first and fourth hydraulic circuits 120a, 120d.

The opposite is true when the vehicle is put into a left-hand turn, where the momentum of the sprung weight of the vehicle tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second and third cross-over hydraulic lines 164b, 164c. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the second and third cross-over hydraulic lines 164b, 164c. When the four comfort valves 144a, 144b, 144c, 144d adjacent to the dampers 102a, 102b, 102c, 102d are closed, the fluid flow out of the second compression chamber 126b of the front right damper 102b, out of the fourth compression chamber 126d of the back right damper 102d, out of the first rebound chamber 128a of the front left damper 102a, and out of the third rebound chamber 128c of the back left damper 102c and into the second and third cross-over hydraulic lines 164b, 164c increases the pressure in the front right and back right accumulators 142b, 142d, thus providing a passive roll resistance where it becomes increasingly more difficult to compress the front right damper 102b and the back right damper 102d since the second compression chamber 126b of the front right damper 102b and the fourth compression chamber 126d of the back right damper 102d are connected in fluid communication with the second and third hydraulic circuits 120b, 120c. At the same time, fluid flows out of front left and back left accumulators 142a, 142c and into the second rebound chamber 128b of the front right damper 102b, into the fourth rebound chamber 128d of the back right damper 102d, into the first compression chamber 126a of the front left damper 102a, and into the third compression chamber 126c of the back left damper 102c. The resulting pressure difference between the dampers 102a, 102b, 102c, 102d generates damper forces that counteract or resist the roll moment of the vehicle. Additional roll resistance can be added by opening the second seat valve 122b and the second comfort valve 160b as the bi-directional pump 110 is running in the first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the second and third hydraulic circuits 120b, 120c.

During braking, the momentum of the sprung weight of the vehicle tends to make the vehicle pitch or dive forward, compressing the front left damper 102a and the front right damper 102b. When this occurs, fluid flows out from the first compression chamber 126a of the front left damper 102a into the first cross-over hydraulic line 164a and out from the second compression chamber 126b of the front right damper 102b into the second cross-over hydraulic line 164b. As a result of the weight transfer to the front of the vehicle, the back left damper 102c and back right damper 102d begin to extend, causing fluid to flow out of the third rebound chamber 128c of the back left damper 102c into the second cross-over hydraulic line 164b and out of the fourth rebound chamber 128d of the back right damper 102d into the first cross-over hydraulic line 164a. With the four comfort valves 144a, 144b, 144c, 144d adjacent to the dampers 102a, 102b, 102c, 102d and the two comfort valves 160a, 160b located on the load distribution unit 104 all closed, the fluid flow out of the third rebound chamber 128c of the back left damper 102c and the fourth rebound chamber 128d of the back right damper 102d into the first and second cross-over hydraulic lines 164a, 164b increases the pressure in the front left and front right accumulators 142a, 142b, thus providing a passive pitch resistance where it becomes increasingly more difficult to compress the front left damper 102a and the front right damper 102b since the first compression chamber 126a of the front left damper 102a and the second compression chamber 126b of the front right damper 102b are connected in fluid communication with the first and second hydraulic circuits 120a, 120b.

During acceleration, the momentum of the sprung weight of the vehicle tends to make the vehicle pitch or squat rearward (i.e., aft), compressing the back left damper 102c and the back right damper 102d. When this occurs, fluid flows out from the third compression chamber 126c of the back left damper 102c into the fourth cross-over hydraulic line 164d and out of the fourth compression chamber 126d of the back right damper 102d into the third cross-over hydraulic line 164c. As a result of the weight transfer to the back/rear of the vehicle, the front left damper 102a and front right damper 102b begin to extend, causing fluid to flow out of the first rebound chamber 128a of the front left damper 102a into the third cross-over hydraulic line 164c and out of the second rebound chamber 128b of the front right damper 102b into the fourth cross-over hydraulic line 164d. With the four comfort valves 144a, 144b, 144c, 144d adjacent to the dampers 102a, 102b, 102c, 102d and the two comfort valves 160a, 160b located on the load distribution unit 104 all closed, the fluid flow out of the first rebound chamber 128a of the front left damper 102a and the second rebound chamber 128b of the front right damper 102b into the third and fourth cross-over hydraulic lines 164c, 164d increases the pressure in the back left and back right accumulators 142c, 142d, thus providing a passive pitch resistance where it becomes increasingly more difficult to compress the back left damper 102c and the back right damper 102d since the third compression chamber 126c of the back left damper 102c and the fourth compression chamber 126d of the back right damper 102d are connected in fluid communication with the third and fourth hydraulic circuits 120c, 120d.

When active or passive roll and/or pitch stiffness is not required, the four comfort valves 144a, 144b, 144c, 144d adjacent to the dampers 102a, 102b, 102c, 102d and the two comfort valves 160a, 160b located on the load distribution unit 104 can be opened to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144a is open and the front left damper 102a undergoes a compression stroke as the front wheel hits a bump, fluid may flow from the first compression chamber 126a of the front left damper 102a, into the first cross-over hydraulic line 164a, from the first cross-over hydraulic line 164a to the third cross-over hydraulic line 164c by passing through the front left bridge hydraulic line 140a and the front left comfort valve 144a, and into the first rebound chamber 128a of the front left damper 102a. Thus, fluid can travel from the first compression chamber 126a to the first rebound chamber 128a of the front left damper 102a with the only restriction coming from the dampening valves in the rebound and compression chamber ports 130a, 130b of the front left damper 102a. As such, when all of the four comfort valves 144a, 144b, 144c, 144d adjacent to the dampers 102a, 102b, 102c, 102d and the two comfort valves 160a, 160b located on the load distribution unit 104 are open, the dampers 102a, 102b, 102c, 102d are effectively decoupled from one another for improved ride comfort. It should also be appreciated that to return the suspension system 100 to this "comfort mode" of operation, the seat valves 122a, 122b, 122c, 122d and/or the first and second comfort valves 160a, 160b may be opened while the bi-directional pump 110 is running in a second direction where the bi-directional pump 110 draws in hydraulic fluid from the pump hydraulic line 108 and discharges hydraulic fluid into the reservoir hydraulic line 118 to produce a negative pressure in the pump hydraulic line 108 that reduces fluid pressure in the hydraulic circuits 120a, 120b, 120c, 120d of the suspension system 100.

With reference to FIGS. 2-5, the load distribution unit 104 of the suspension system 100 is illustrated in more detail. The load distribution unit 104 includes a first pair of opposed cylinders 166a, 166b and a second pair of opposed cylinders 167a, 167b that slidingly receive first and second piston rod assemblies 168a, 168b, respectively. The first piston rod assembly 168a includes a first piston rod 158 and a first pair of opposed pistons 170a, 170b that are mounted to opposing ends of the first piston rod 158. The second piston rod assembly 168b includes a second piston rod 159 and a second pair of opposed pistons 171a, 171b that are mounted to opposing ends of the second piston rod 159. The first piston rod 158 extends through and is support by a first integral rod guide and pressure tube coupler 172 and the second piston rod 159 extends through and is support by a second integral rod guide and pressure tube coupler 173. Each integral rod guide and pressure tube coupler 172, 173 includes a through-bore 111, 113 that slidingly receives one of the piston rods 158, 159.

Figure 4:
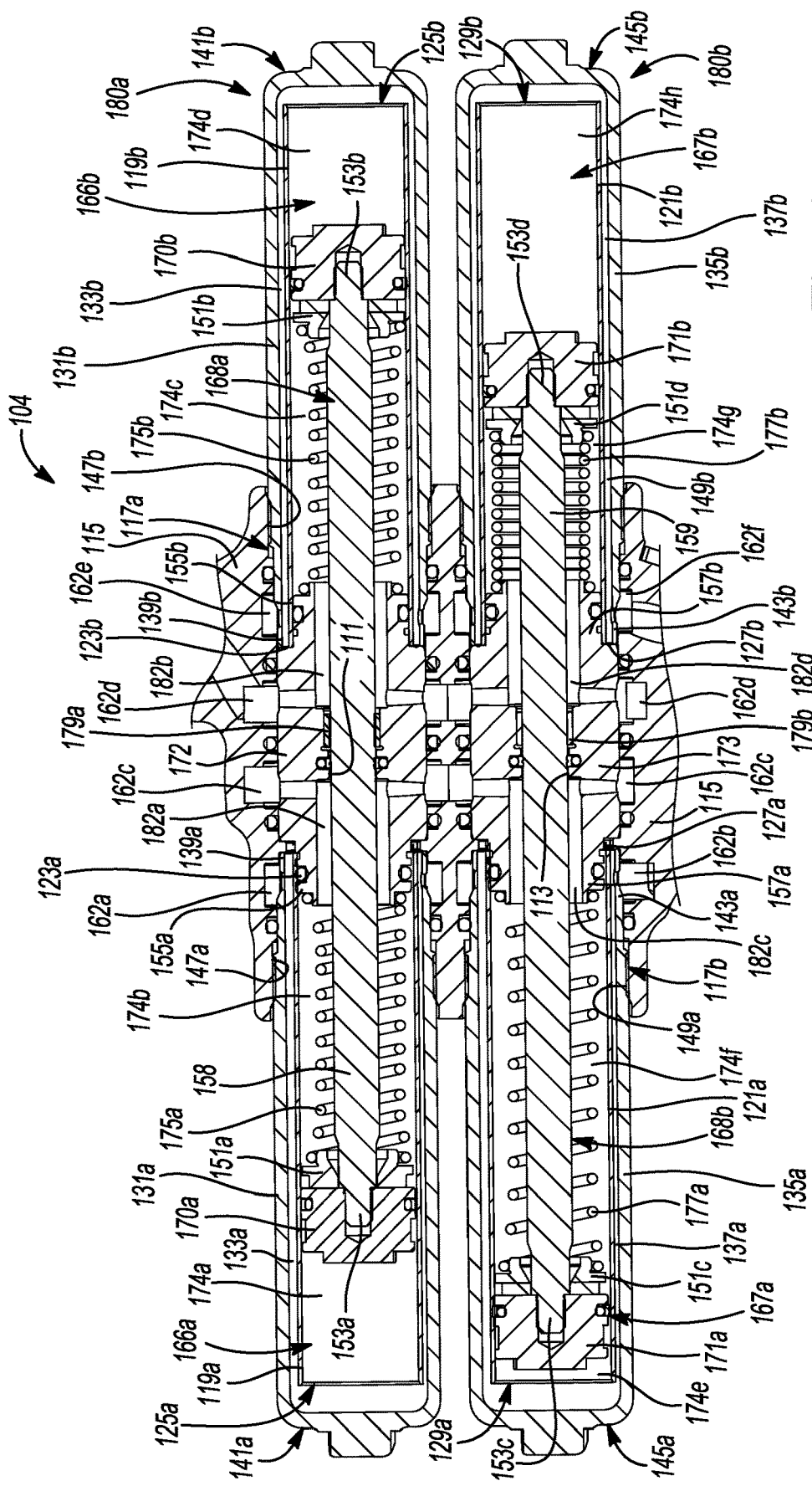
FIG. 4 is a top cross-sectional view of the exemplary load distribution unit illustrated in FIG. 3.

The first pair of opposed pistons 170a, 170b divides the first pair of opposed cylinders 166a, 166b into four distinct cylinder chambers: a first cylinder chamber 174a that is arranged in fluid communication with the first manifold passageway 162a, a second cylinder chamber 174b that is arranged in fluid communication with the third manifold passageway 162c, a third cylinder chamber 174c that is arranged in fluid communication with the fourth manifold passageway 162d, and a fourth cylinder chamber 174d that is arranged in fluid communication with the fifth manifold passageway 162e. Similarly, the second pair of opposed pistons 171a, 171b divides the second pair of opposed cylinders 167a, 167b into four more distinct cylinder chambers: a fifth cylinder chamber 174e that is arranged in fluid communication with the second manifold passageway 162b, a sixth cylinder chamber 174f that is arranged in fluid communication with the third manifold passageway 162c, a seventh cylinder chamber 174g that is arranged in fluid communication with the fourth manifold passageway 162d, and an eighth cylinder chamber 174h that is arranged in fluid communication with the sixth manifold passageway 162f. As shown in FIG. 4, the first piston rod assembly 168a has a first pair of opposed piston springs 175a, 175b that are co-axially positioned about the first piston rod 158 and extend outwardly from each side of the first integral rod guide and pressure tube coupler 172 to the first pair of opposed pistons 170a, 170b. As such, the first pair of opposed piston springs 175a, 175b are positioned within the second and third cylinder chambers 174b, 174c and naturally bias the first piston rod 158 and the first pair of opposed pistons 170a, 170b to a centered position where the second and third cylinder chambers 174b, 174c and the first and fourth cylinder chambers 174a, 174d have equal volumes. Similarly, the second piston rod assembly 168b has a second pair of opposed piston springs 177a, 177b that are co-axially positioned about the second piston rod 159 and extend outwardly from each side of the second integral rod guide and pressure tube coupler 173 to the second pair of opposed pistons 171a, 171b. As such, the second pair of opposed piston springs 177a, 177b are positioned within the sixth and seventh cylinder chambers 174f, 174g and naturally bias the second piston rod 159 and the second pair of opposed pistons 171a, 171b to a centered position where the fifth and eighth cylinder chambers 174e, 174h and the sixth and seventh cylinder chambers 174f, 174g have equal volumes.

The first manifold passageway 162a is arranged in fluid communication with the first manifold hydraulic line 138a, the second manifold passageway 162b is arranged in fluid communication with the second manifold hydraulic line 138b, the fifth manifold passageway 162e is arranged in fluid communication with the fourth manifold hydraulic line 138d, and the sixth manifold passageway 162f is arranged in fluid communication with the third manifold hydraulic line 138c. The third manifold passageway 162c is arranged in fluid communication with the second and sixth cylinder chambers 174b, 174f while the fourth manifold passageway 162d is arranged in fluid communication with the third and seventh cylinder chambers 174c, 174g. As a result, fluid pressure in the fourth cylinder chamber 174d and thus the fifth manifold passageway 162e can be increased independently of the first manifold passageway 162a by closing the first comfort valve 160a and opening the fourth seat valve 122d when the bi-directional pump 110 is running in the first direction, which increases pressure in the third cylinder chamber 174c and urges the first piston rod 158 and the first pair of opposed pistons 170a, 170b to the right in FIGS. 2 and 4, decreasing the volume of the fourth cylinder chamber 174d and increasing the pressure in the fourth cylinder chamber 174d. Similarly, fluid pressure in the eighth cylinder chamber 174h and thus the sixth manifold passageway 162f can be increased independently of the second manifold passageway 162b by closing the second comfort valve 160b and opening the fourth seat valve 122d when the bi-directional pump 110 is running in the first direction, which increases pressure in the seventh cylinder chamber 174g and urges the second piston rod 159 and the second pair of opposed pistons 171a, 171b to the right in FIGS. 2 and 4, decreasing the volume of the eighth cylinder chamber 174h and increasing the pressure in the eighth cylinder chamber 174h.

Figure 2:
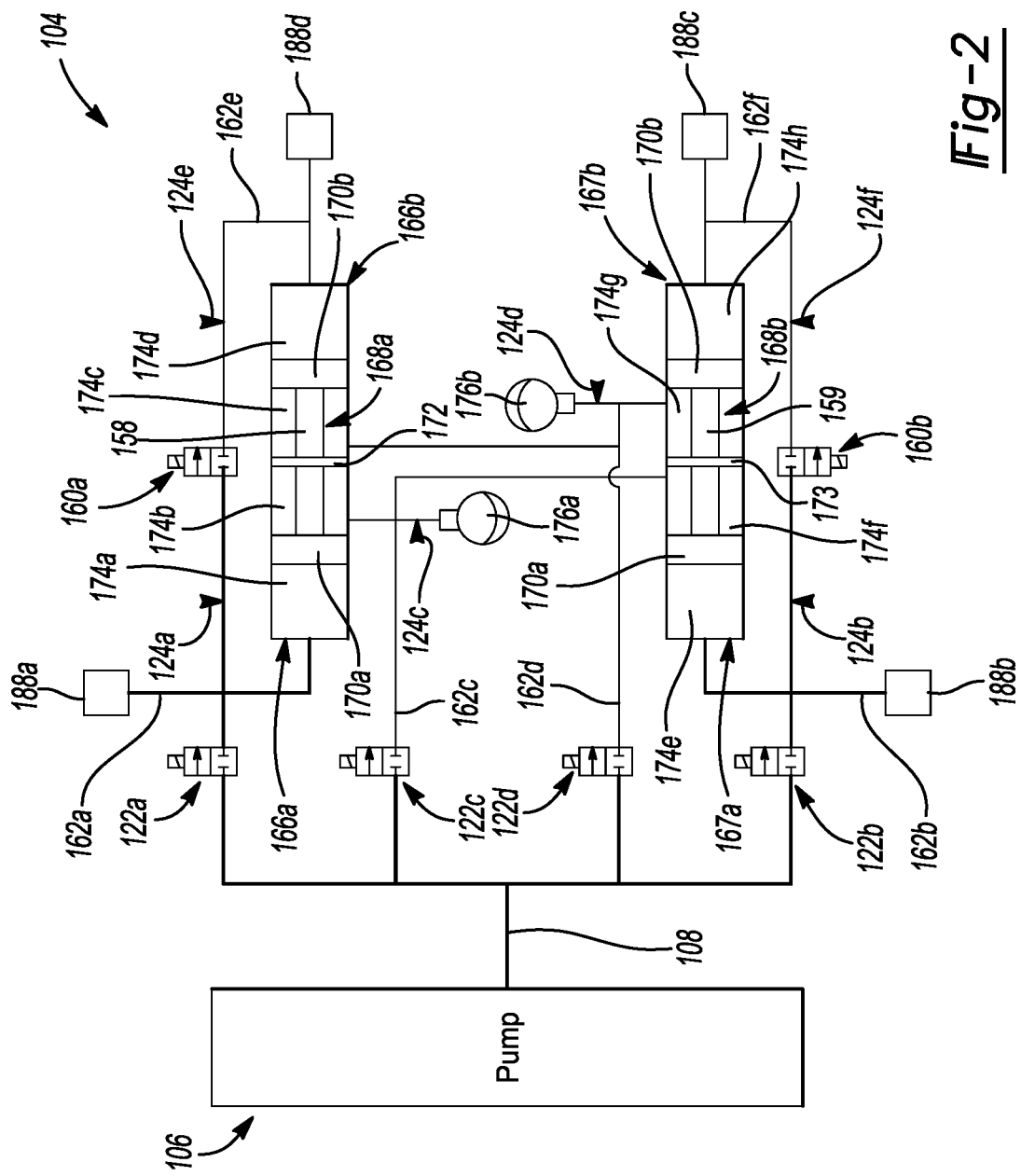
FIG. 2 is a schematic diagram illustrating the exemplary load distribution unit and pump illustrated in FIG. 1.

Fluid pressure in the first cylinder chamber 174a and thus the first manifold passageway 162a can also be increased without opening the first seat valve 122a by actuating the first piston rod assembly 168a, where the first comfort valve 160a is closed and the third seat valve 122c is open when the bi-directional pump 110 is running in the first direction, which increases pressure in the second cylinder chamber 174b and urges the first piston rod 158 and the first pair of opposed pistons 170a, 170b to the left in FIGS. 2 and 4, decreasing the volume of the first cylinder chamber 174a and increasing the pressure in the first cylinder chamber 174a. Similarly, fluid pressure in the fifth cylinder chamber 174e and the second manifold passageway 162b can also be increased without opening the second seat valve 122b by actuating the second piston rod assembly 168b, where the second comfort valve 160b is closed and the third seat valve 122c is open when the bi-directional pump 110 is running in the first direction, which increases pressure in the sixth cylinder chamber 174f and urges the second piston rod 159 and the second pair of opposed pistons 171a, 171b to the left in FIGS. 2 and 4, decreasing the volume of the fifth cylinder chamber 174e and increasing the pressure in the second cylinder chamber 174e.

The load distribution unit 104 may further include a first manifold accumulator 176a that is arranged in fluid communication with the third manifold passageway 162c between the third seat valve 122c and the second and sixth cylinder chambers 174b, 174f and a second manifold accumulator 176b that is arranged in fluid communication with the fourth manifold passageway 162d between the third and seventh cylinder chambers 174c, 174g. The first and second manifold accumulators 176a, 176b may be constructed in a number of different ways. For example and without limitation, the first and second manifold accumulators 176a, 176b may have accumulation chambers and pressurized gas chambers that are separated by floating pistons or flexible membranes. Under braking, fluid flow within the four hydraulic circuits 120a, 120b, 120c, 120d generates a pressure difference between the first and second manifold accumulators 176a, 176b, which in turn causes an increase in pressure in the front left and front right accumulators 142a, 142b and provides a pitch stiffness that resists the compression of the front dampers 102a, 102b and rebound/extension of the back dampers 102c, 102d. Under acceleration, fluid flow within the four hydraulic circuits 120a, 120b, 120c, 120d generates an opposite pressure difference between the first and second manifold accumulators 176a, 176b, which in turn causes an increase in pressure in the back left and back right accumulators 142c, 142d and provides a pitch stiffness that resists the rebound/extension of the front dampers 102a, 102b and compression of the back dampers 102c, 102d. Additional pitch resistance can be added before a braking or acceleration event by opening the third and fourth seat valves 122c, 122d as the bi-directional pump 110 is running in the first direction. The bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the first and second manifold accumulators 176a, 176b. In a similar way, the pitch stiffness of the system can be reduced before a braking or acceleration event by running the bi-directional pump 110 in the second direction while opening the third and fourth seat valves 122c, 122d.

The load distribution unit 104 may also include six pressure sensors 124a, 124b, 124c, 124d, 124e, 124f: a first pressure sensor 124a arranged to monitor fluid pressure in the first manifold passageway 162a, a second pressure sensor 124b arranged to monitor fluid pressure in the second manifold passageway 162b, a third pressure sensor 124c arranged to monitor fluid pressure in the third manifold passageway 162c, a fourth pressure sensor 124d arranged to monitor fluid pressure in the fourth manifold passageway 162d, a fifth pressure sensor 124e arranged to monitor fluid pressure in the fifth manifold passageway 162e, and a sixth pressure sensor 124f arranged to monitor fluid pressure in the sixth manifold passageway 162f. While not shown in FIG. 2, the pressure sensors 124a, 124b, 124c, 124d, 124e, 124f are all electrically connected to the controller.

Figure 3:
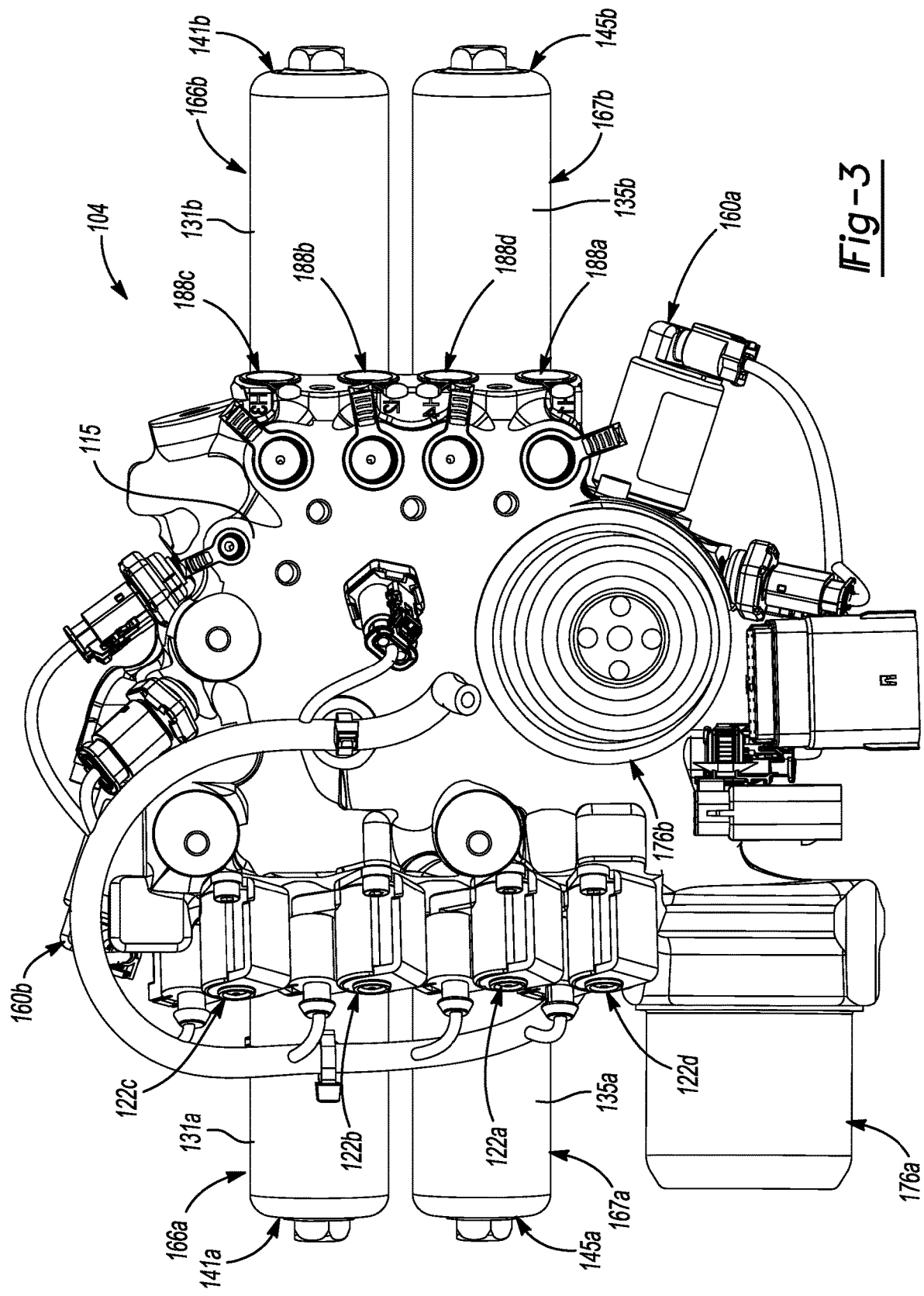
FIG. 3 is a top plan view of the exemplary load distribution unit illustrated in FIG. 2.
Figure 5:
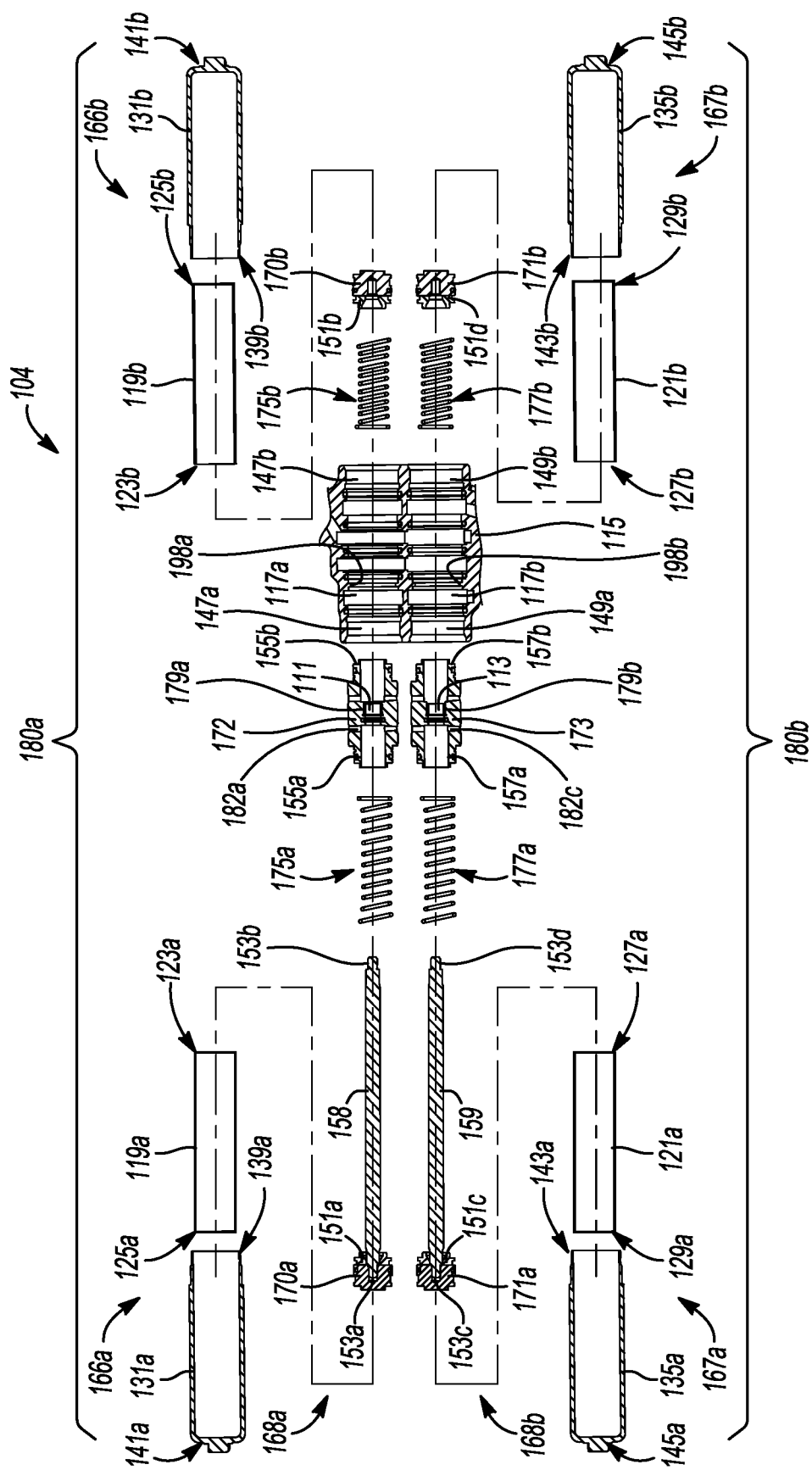
FIG. 5 is a top exploded, cross-sectional view of the exemplary load distribution unit illustrated in FIG. 4.

As seen in FIGS. 3-5, the load distribution unit 104 includes a manifold block 115 with first and second cylinder bores 117a, 117b that extend through the manifold block 115 in a parallel and spaced apart relationship. A first pair of pressure tubes 119a, 119b are partially received in the first cylinder bore 117a on opposing sides of the manifold block 115 to define the first pair of opposed cylinders 166a, 166b. A second pair of pressure tubes 121a, 121b are partially received in the second cylinder bore 117b on opposing sides of the manifold block 115 to define the second pair of opposed cylinders 167a, 167b. The first pair of pressure tubes 119a, 119b extend longitudinally between a first pair of inboard pressure tube ends 123a, 123b and a first pair of outboard pressure tube ends 125a, 125b. The second pair of pressure tubes 121a, 121b extend longitudinally between a second pair of inboard pressure tube ends 127a, 127b and a second pair of outboard pressure tube ends 129a, 129b.

In addition, a first pair of reserve tubes 131a, 131b are partially received in the first cylinder bore 117a on opposing sides of the manifold block 115 and are arranged annularly about the first pair of pressure tubes 119a, 119b in a concentric/co-axial arrangement. As such, a first pair of reservoir chambers 133a, 133b are defined between the first pair of pressure tubes 119a, 119b and the first pair of reserve tubes 131a, 131b. A second pair of reserve tubes 135a, 135b are partially received in the second cylinder bore 117b on opposing sides of the manifold block 115 and are arranged annularly about the second pair of pressure tubes 121a, 121b in a concentric/co-axial arrangement. As a result, a second pair of reservoir chambers 137a, 137b are defined between the second pair of pressure tubes 121a, 121b and the second pair of reserve tubes 135a, 135b. The first pair of reserve tubes 131a, 131b extend longitudinally between a first pair of inboard reserve tube ends 139a, 139b and a first pair of outboard reserve tube ends 141a, 141b. The second pair of reserve tubes 135a, 135b extend longitudinally between a second pair of inboard reserve tube ends 143a, 143b and a second pair of outboard reserve tube ends 145a, 145b.

The first pair of inboard pressure tube ends 123a, 123b, the first pair of outboard pressure tube ends 125a, 125b, the second pair of inboard pressure tube ends 127a, 127b, and the second pair of outboard pressure tube ends 129a, 129b are all constructed as open tube ends. In addition, the first pair of inboard reserve tube ends 139a, 139b and the second pair of inboard reserve tube ends 143a, 143b are constructed as open tube ends. However, the first pair of outboard reserve tube ends 141a, 141b and the second pair of outboard reserve tube ends 145a, 145b are constructed as closed tube ends.

The first cylinder bore 117a in the manifold block 115 includes a first pair of counterbores 147a, 147b of increased diameter and the second cylinder bore 117b in the manifold block 115 includes a second pair of counterbores 149a, 149b of increased diameter. The first pair of inboard reserve tube ends 139a, 139b are threaded into the first pair of counterbores 147a, 147b in the manifold block 115 and the second pair of inboard reserve tube ends 143a, 143b are threaded into the second pair of counterbores 149a, 149b in the manifold block 115.

The load distribution unit 104 includes a first piston rod assembly 168a with a first piston rod 158, a first pair of opposed pistons 170a, 170b that are mounted on the first piston rod 158, and a first pair of opposed piston springs 175a, 175b. In the illustrated example, a first pair of spring seats 151a, 151b are positioned on the first piston rod 158 between the first pair of opposed piston springs 175a, 175b and the first pair of opposed pistons 170a, 170b and the first pair of opposed pistons 170a, 170b are threaded onto a first pair of threaded ends 153a, 153b on the first piston rod 158. The first pair of opposed pistons 170a, 170b are slidingly received within the first pair of opposed cylinders 166a, 166b. The first integral rod guide and pressure tube coupler 172 is received in the first cylinder bore 117a in the manifold block 115 until it makes contact with and abuts a first shoulder 198a within the cylinder bore 117a, which provides a stop. The first integral rod guide and pressure tube coupler 172 includes first through-bore 111. The first piston rod 158 extends through the first through-bore 111 in the first integral rod guide and pressure tube coupler 172 in a sliding fit. The first through-bore 111 in the first integral rod guide and pressure tube coupler 172 may further include a bearing bush 179a and one or more seals positioned in grooves in the first through-bore 111. The first pair of inboard pressure tube ends 123a, 123b are received in the first cylinder bore 117a and are retained on opposing ends of the first integral rod guide and pressure tube coupler 172. More specifically, each end of the first integral rod guide and pressure tube coupler 172 includes a boss 155a, 155b with a reduced diameter. The first pair of inboard pressure tube ends 123a, 123b are slid over the bosses 155a, 155b on the opposing ends of the first integral rod guide and pressure tube coupler 172 and are fixed by a notching operation such that the first integral rod guide and pressure tube coupler 172 holds the first pair of pressure tubes 119a, 119b together in a co-axial arrangement about the first piston rod assembly 168a as a first modular pressure tube and piston subassembly 180a.

Similarly, the load distribution unit 104 includes a second piston rod assembly 168b with a second piston rod 159, a second pair of opposed pistons 171a, 171b that are mounted on the second piston rod 159, and a second pair of opposed piston springs 177a, 177b. In the illustrated example, a second pair of spring seats 151c, 151d are positioned on the second piston rod 159 between the second pair of opposed piston springs 177a, 177b and the second pair of opposed pistons 171a, 171b and the second pair of opposed pistons 171a, 171b are threaded onto a second pair of threaded ends 153c, 153d on the second piston rod 159. The second pair of opposed pistons 171a, 171b are slidingly received within the second pair of opposed cylinders 167a, 167b. The second integral rod guide and pressure tube coupler 173 is received in the second cylinder bore 117b in the manifold block 115 until it makes contact with and abuts a second shoulder 198b within the cylinder bore 117b, which provides a stop. The second integral rod guide and pressure tube coupler 173 includes second through-bore 113. The second piston rod 159 extends through the second through-bore 113 in the second integral rod guide and pressure tube coupler 173 in a sliding fit. The second through-bore 113 in the second integral rod guide and pressure tube coupler 173 may further include a second bearing bush 179b and one or more seals positioned in grooves in the second through-bore 113. The second pair of inboard pressure tube ends 127a, 127b are received in the second cylinder bore 117b and are retained on opposing ends of the second integral rod guide and pressure tube coupler 173. More specifically, each end of the second integral rod guide and pressure tube coupler 173 includes a boss 157a, 157b with a reduced diameter. The second pair of inboard pressure tube ends 127a, 127b are slid over the bosses 157a, 157b on the opposing ends of the second integral rod guide and pressure tube coupler 173 and are fixed by a notching operation such that the second integral rod guide and pressure tube coupler 173 holds the second pair of pressure tubes 121a, 121b together in a co-axial arrangement about the first piston rod assembly 168b as a second modular pressure tube and piston subassembly 180b.

The first pair of reservoir chambers 133a, 133b includes a first reservoir chamber 133a and a second reservoir chamber 133b. The second pair of reservoir chambers 137a, 137b includes a third reservoir chamber 137a and a fourth reservoir chamber 137b. The first cylinder chamber 174a and the first reservoir chamber 133a are arranged in fluid communication with one another and collectively form a first pressure chamber 133a, 174a within the load distribution unit 104 that is arranged in fluid communication with the first manifold passageway 162a. The fourth cylinder chamber 174d and the second reservoir chamber 133b are arranged in fluid communication with one another and collectively form a second pressure chamber 133b, 174d within the load distribution unit 104 that is arranged in fluid communication with the fifth manifold passageway 162e.

The first integral rod guide and pressure tube coupler 172 includes a first rod guide passage 182a that extends through the first integral rod guide and pressure tube coupler 172 between the second cylinder chamber 174b and the third manifold passageway 162c and a second rod guide passage 182b that extends through the first integral rod guide and pressure tube coupler 172 between the third cylinder chamber 174c and the fourth manifold passageway 162d. The second integral rod guide and pressure tube coupler 173 includes a third rod guide passage 182c that extends through the second integral rod guide and pressure tube coupler 173 between the sixth cylinder chamber 174f and the third manifold passageway 162c and a fourth rod guide passage 182d that extends through the second integral rod guide and pressure tube coupler 173 between the seventh cylinder chamber 174g and the fourth manifold passageway 162d. As such, it should be appreciated that the second and sixth cylinder chambers 174b, 174f are arranged in fluid communication with one another via the first and third rod guide passages 182a, 182c and the third manifold passageway 162c, which combine to collectively form a third pressure chamber 162c, 174b, 174f, 182a, 182c within said load distribution unit 104. It should also be appreciated that the third and seventh cylinder chambers 174c, 174g are arranged in fluid communication with one another via the second and fourth rod guide passages 182b, 182d and the fourth manifold passageway 162d, which combine to collectively form a fourth pressure chamber 162d, 174c, 174g, 182b, 182d within the load distribution unit 104.

The fifth cylinder chamber 174e and the third reservoir chamber 137a are arranged in fluid communication with one another and collectively form a fifth pressure chamber 137a, 174e within the load distribution unit 104 that is arranged in fluid communication with the second manifold passageway 162b. Finally, the eighth cylinder chamber 174h and the fourth reservoir chamber 137b are arranged in fluid communication with one another and collectively form a sixth pressure chamber 137b, 174h within the load distribution unit 104 that is arranged in fluid communication with the sixth manifold passageway 162f. Thus, the first pressure chamber 133a, 174a of the load distribution unit 104 is arranged in fluid communication with the first hydraulic circuit 120a of the suspension system 100, the second pressure chamber 133b, 174d of the load distribution unit 104 is arranged in fluid communication with the fourth hydraulic circuit 120d of the suspension system 100, the fifth pressure chamber 137a, 174e of the load distribution unit 104 is arranged in fluid communication with the second hydraulic circuit 120b of the suspension system 100, and the sixth pressure chamber 137b, 174h of the load distribution unit 104 is arranged in fluid communication the third hydraulic circuit 120c of the suspension system 100.

The first cylinder chamber 174a and the first reservoir chamber 133a are arranged in fluid communication with a first manifold port 188a that connects with the first manifold hydraulic line 138a. The fifth cylinder chamber 174e and the third reservoir chamber 137a are arranged in fluid communication with a second manifold port 188b that connects with the second manifold hydraulic line 138b. The eighth cylinder chamber 174h and the fourth reservoir chamber 137b are arranged in fluid communication with a third manifold port 188c that connects with the third manifold hydraulic line 138c. The fourth cylinder chamber 174d and the second reservoir chamber 133b are arranged in fluid communication with a fourth manifold port 188d that connects with the fourth manifold hydraulic line 138d.

It should also be appreciated that in FIG. 4, the pressures in the first and fourth cylinder chambers 174a, 174d are substantially the same such that the first piston rod assembly 168a is longitudinally centered in the first cylinder bore 117a of the manifold block 115, the first and fourth cylinder chambers 174a, 174d are substantially equivalent in volume, and the first pair of opposed piston springs 175a, 175b are in a substantially equal state of compression. By contrast, in FIG. 4, the pressure in the fifth cylinder chamber 174e is less than the pressure in the eighth cylinder chamber 174h such that the second piston rod assembly 168b is shifted longitudinally to the left in the second cylinder bore 117b of the manifold block 115, the fifth cylinder chamber 174e has a smaller volume than the eighth cylinder chamber 174h, and opposed piston spring 177b is in a greater state of compression than opposed piston spring 177a.

Figure 6:
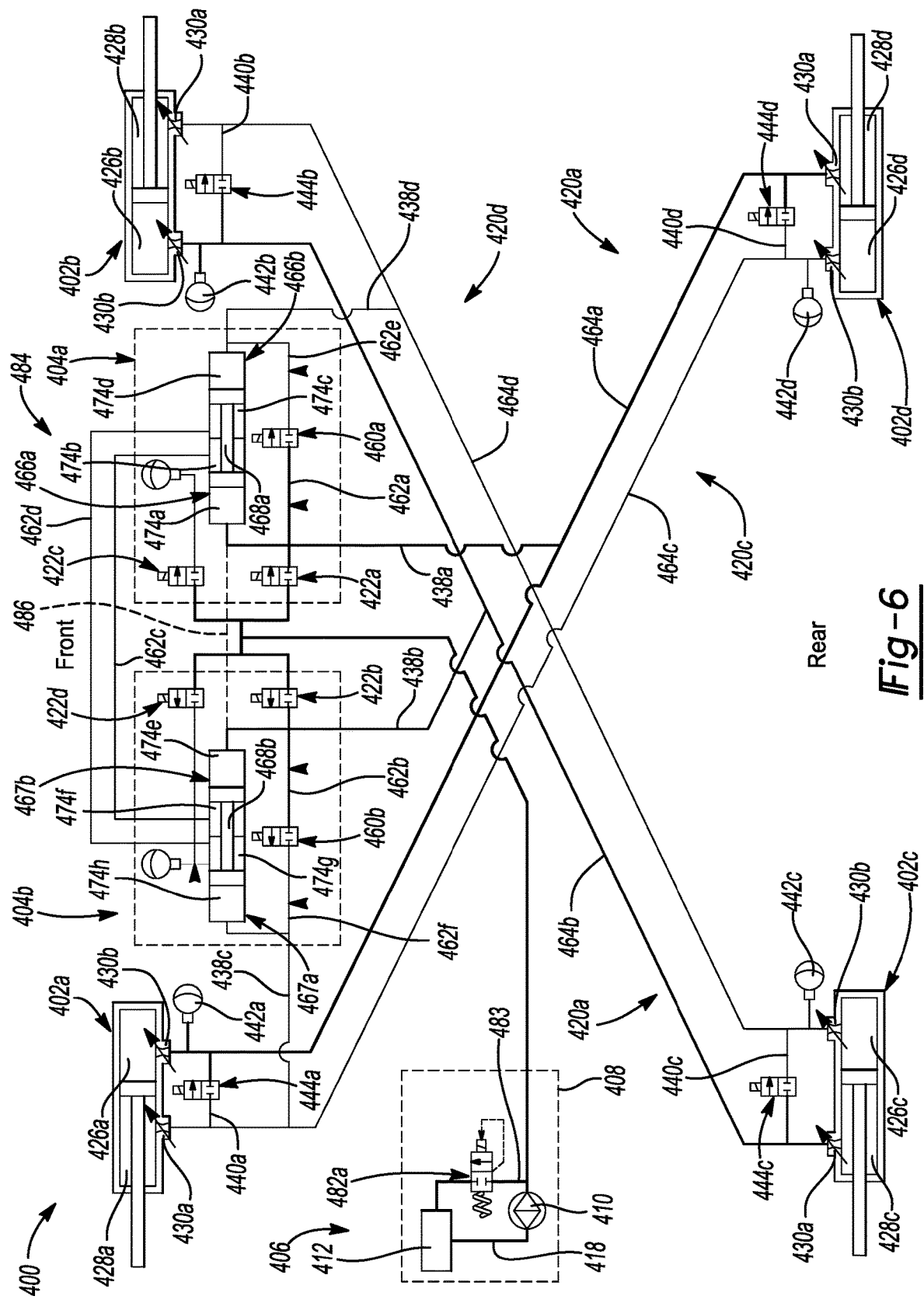
FIG. 6 is a schematic diagram illustrating another exemplary suspension system of the present disclosure that includes four hydraulic circuits connecting the front and rear dampers and a pair of split load distribution units positioned between the front dampers.
Figure 7:
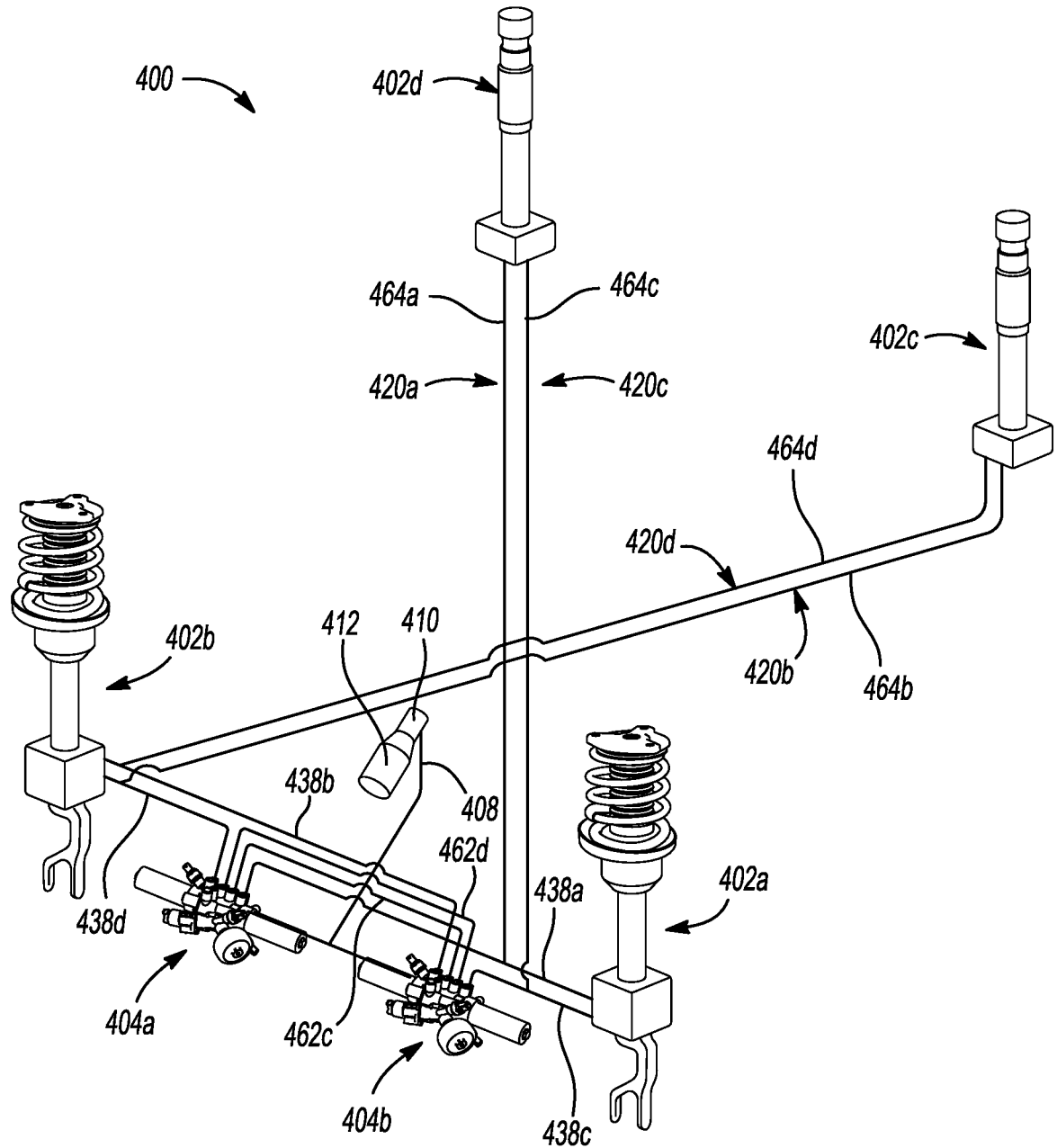
FIG. 7 is a front perspective view of the exemplary suspension system illustrated in FIG. 6.

FIGS. 6 and 7 illustrate another suspension system 400 that shares many of the same components as the suspension system 100 illustrated in FIG. 1, but in FIGS. 6 and 7 a pair of split load distribution units 404a, 404b have been utilized, which collectively form a suspension control system 484. Rather than repeat the description set forth above, the following paragraphs describe the structure and function of the components in FIGS. 6 and 7 that are new and/or different from those shown and described in connection with FIG. 1. It should be appreciated that the reference numbers in FIG. 1 are "100" series numbers (e.g., 104) whereas the components in FIGS. 6 and 7 that are the same or similar to the components of the suspension system 100 shown in FIG. 1 share the same base reference numbers, but are listed as "400" series numbers (e.g., 404a, 404b). Thus, the same description for element 100 above applies to element 400 in FIGS. 6 and 7 and so on and so forth.

The load distribution unit 404 illustrated in FIGS. 6 and 7 has the same function and many of the same components as the load distribution unit 104 illustrated in FIG. 1, but in FIGS. 6 and 7 there are a pair of split load distribution units 404a, 404b, which allows the load distribution units 404a, 404b to be packaged in the front of the vehicle between the front dampers 402a, 402b, in the rear of the vehicle between the rear dampers 402c, 402d, or in alternative locations, if desired. The first split load distribution unit 404a includes the first pair of opposed cylinders 466a, 466b, the first piston rod assembly 468a, the first seat valve 422a, the third seat valve 422c, the first comfort valve 460a, and the first manifold accumulator 476a. The second split load distribution unit 404b includes the second pair of opposed cylinders 467a, 467b, the second piston rod assembly 468b, the second seat valve 422b, the fourth seat valve 422d, and the second comfort valve 460b. The pump hydraulic line 408 extends between the split load distribution units 404a, 404b and splits (T's) to connect to the seat valves 422a, 422b, 422c, 422d on either side. Third and fourth manifold conduits 462c, 462d extend laterally between the split load distribution units 404a, 404b to connect the second and sixth cylinder chambers 474b, 474f and the third and seventh cylinder chambers 474c, 474g, respectively. It should be appreciated that the order/right-to-left arrangement of the cylinder chambers 474e, 474f, 474g, 474h in the second split load distribution unit 404b shown in FIGS. 6 and 7 is opposite from that shown in FIGS. 1 and 2. In other words, in accordance with the arrangement shown in FIGS. 6 and 7, the first cylinder chamber 474a, which is connected in fluid communication with a first manifold conduit 462a, faces the fifth cylinder chamber 474e, which is connected in fluid communication with a second manifold conduit 462b. In other words, in FIGS. 6 and 7 the fifth cylinder chamber 474e, which is connected in fluid communication with the second manifold conduit 462b, is to the right of the eighth cylinder chamber 474h, which is connected in fluid communication with the sixth manifold conduit 462f, whereas in FIG. 1 the fifth cylinder chamber 174e, which is connected in fluid communication with the second manifold passageway 162b, is to the left of the eighth cylinder chamber 174h, which is connected in fluid communication with the sixth manifold passageway 162f. This reversal of the arrangement of the cylinder chambers 474e, 474f, 474g, 474h in the second split load distribution unit 404b simplifies and shortens the runs required for the manifold conduits 462a, 462b, 462c, 462d, 462e, 462f and is therefore advantageous.

Thus, the first split load distribution unit 404a is configured to be arranged in fluid communication with the dampers 402a-402d through connections to the first and fourth hydraulic circuits 420a, 420d. The second split load distribution unit 404b is configured to be arranged in fluid communication with the dampers 402a-402d through connections to the second and third hydraulic circuits 420b, 420c. Each split load distribution unit 404a, 404b includes a manifold block with a cylinder bore, a pair of pressure tubes, a piston rod assembly, and a pair of reserve tubes. The first and second split load distribution units 404a, 404b may be positioned in an end-to-end arrangement where the first piston rod assembly 468a and the second piston rod assembly 468b are aligned with one another along a common axis 886.

Figure 8:
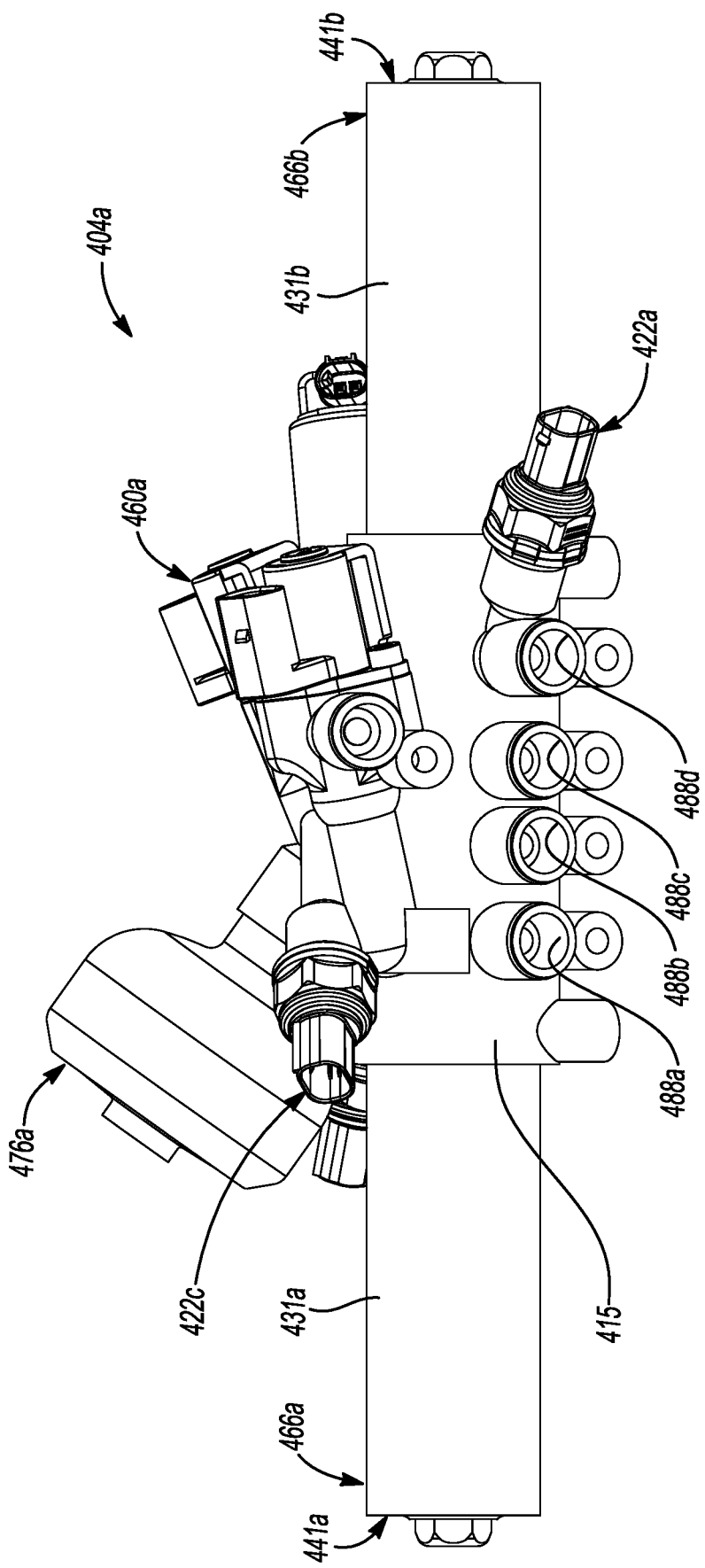
FIG. 8 is a top plan view of one of the exemplary load distribution units illustrated in FIG. 6.
Figure 9:
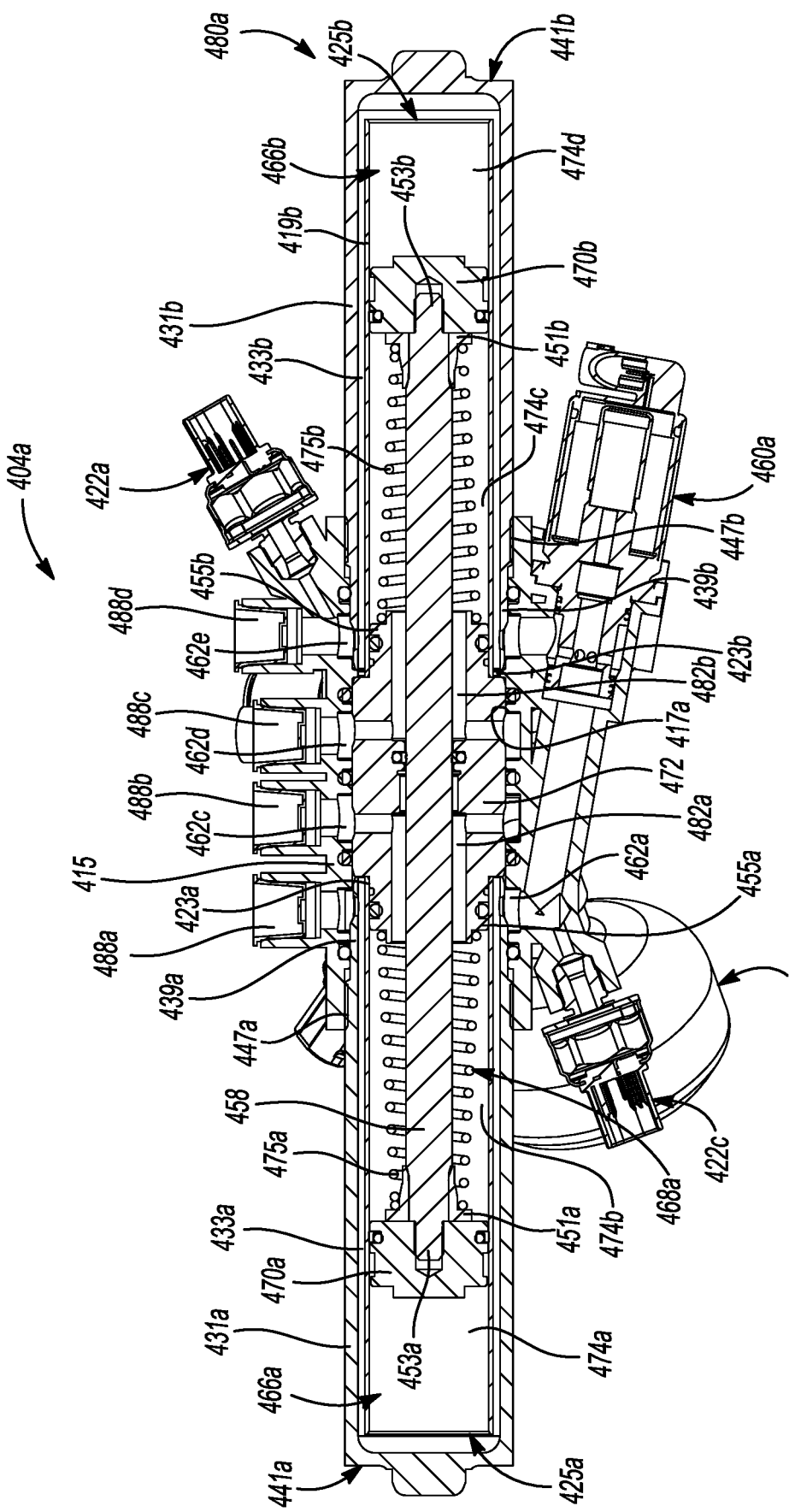
FIG. 9 is a top cross-sectional view of the exemplary load distribution unit illustrated in FIG. 8.
Figure 10:
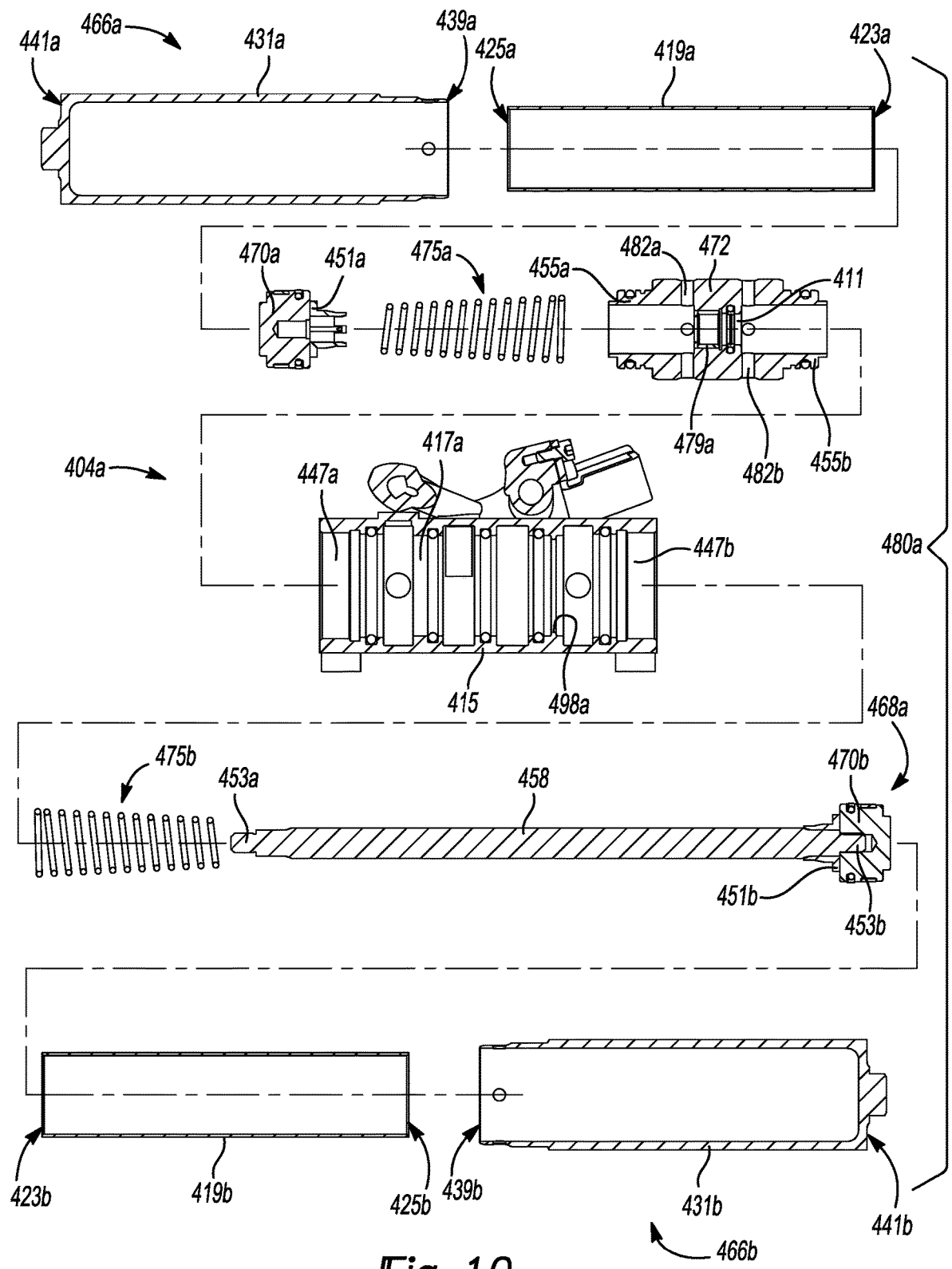
FIG. 10 is a top exploded, cross-sectional view of the exemplary load distribution unit illustrated in FIG. 8.

FIGS. 8-10 illustrate the first split load distribution unit 404a; however, it should be appreciated that the second split load distribution unit 404b has an identical construction. The first split load distribution unit 404a shown in FIGS. 8-10 includes a manifold block 415 with a first cylinder bore 417a that extends longitudinally through the manifold block 415. A first pair of pressure tubes 419a, 419b are partially received in the first cylinder bore 417a on opposing sides of the manifold block 415 to define the first pair of opposed cylinders 466a, 466b. The first pair of pressure tubes 419a, 419b extend longitudinally between a first pair of inboard pressure tube ends 423a, 423b and a first pair of outboard pressure tube ends 425a, 425b. A first pair of reserve tubes 431a, 431b are also partially received in the first cylinder bore 417a on opposing sides of the manifold block 415 and are arranged annularly about the first pair of pressure tubes 419a, 419b in a concentric/co-axial arrangement. As such, a first pair of reservoir chambers 433a, 433b are defined between the first pair of pressure tubes 419a, 419b and the first pair of reserve tubes 431a, 431b.

In particular, the first pair of reserve tubes 431a, 431b extend longitudinally between a first pair of inboard reserve tube ends 439a, 439b and a first pair of outboard reserve tube ends 441a, 441b. The first pair of inboard pressure tube ends 423a, 423b, the first pair of outboard pressure tube ends 425a, 425b, and the first pair of inboard reserve tube ends 439a, 439b are constructed as open tube ends. By contrast, the first pair of outboard reserve tube ends 441a, 441b are constructed as closed tube ends. The first cylinder bore 417a in the manifold block 415 includes a first pair of counterbores 447a, 447b of increased diameter and the first pair of inboard reserve tube ends 439a, 439b are threaded into the first pair of counterbores 447a, 447b in the manifold block 415.

The first split load distribution unit 404a includes a first piston rod assembly 468a with a first piston rod 458, a first pair of opposed pistons 470a, 470b that are mounted on the first piston rod 458, and a first pair of opposed piston springs 475a, 475b. In the illustrated example, a first pair of spring seats 451a, 451b are positioned on the first piston rod 458 between the first pair of opposed piston springs 475a, 475b and the first pair of opposed pistons 470a, 470b and the first pair of opposed pistons 470a, 470b are threaded onto a first pair of threaded ends 453a, 453b on the first piston rod 458. The first pair of opposed pistons 470a, 470b are slidingly received within the first pair of opposed cylinders 466a, 466b. A first integral rod guide and pressure tube coupler 472 is received in the first cylinder bore 417a in the manifold block 415 until it makes contact with and abuts a shoulder 498a within the cylinder bore 417a, which provides a stop. The first integral rod guide and pressure tube coupler 472 includes a first through-bore 411. The first piston rod 458 extends through the first through-bore 411 in the first integral rod guide and pressure tube coupler 472 in a sliding fit. The first through-bore 411 in the first integral rod guide and pressure tube coupler 472 may further include a bearing bush 479 and one or more seals positioned in grooves in the first through-bore 411. The first pair of opposed piston springs 475a, 475b gradually decrease in diameter moving from the first integral rod guide and pressure tube coupler 472 towards the first pair of spring seats 451a, 451b. The first pair of inboard pressure tube ends 423a, 423b are received in the first cylinder bore 417a and are retained on opposing ends of the first integral rod guide and pressure tube coupler 472. More specifically, each end of the first integral rod guide and pressure tube coupler 472 includes a boss 455a, 455b with a reduced diameter. The first pair of inboard pressure tube ends 423a, 423b are slid over the bosses 455a, 455b on the opposing ends of the first integral rod guide and pressure tube coupler 472 and are fixed by a notching operation such that the first integral rod guide and pressure tube coupler 472 holds the first pair of pressure tubes 419a, 419b together in a co-axial arrangement about the first piston rod assembly 468a as a first modular pressure tube and piston subassembly 480a.

The first pair of reservoir chambers 433a, 433b includes a first reservoir chamber 433a and a second reservoir chamber 433b. The first cylinder chamber 474a and the first reservoir chamber 433a are arranged in fluid communication with one another and collectively form a first pressure chamber 433a, 474a within the first split load distribution unit 404a that is arranged in fluid communication with a first manifold port 488a that connects with the first manifold conduit 462a. The first integral rod guide and pressure tube coupler 472 includes a first rod guide passage 482a and a second rod guide passage 182b. The first rod guide passage 482a extends through the first integral rod guide and pressure tube coupler 472 from the second cylinder chamber 474b to a second manifold port 488b that connects with the third manifold conduit 462c. The second rod guide passage 182b extends through the first integral rod guide and pressure tube coupler 472 from the third cylinder chamber 474c to a third manifold port 488c that connects with the fourth manifold conduit 462d. The fourth cylinder chamber 474d and the second reservoir chamber 433b are arranged in fluid communication with one another and collectively form a second pressure chamber 433b, 474d within the first split load distribution unit 404a that is arranged in fluid communication with a fourth manifold port 488d that connects with the fifth manifold conduit 462e.

Figure 11:
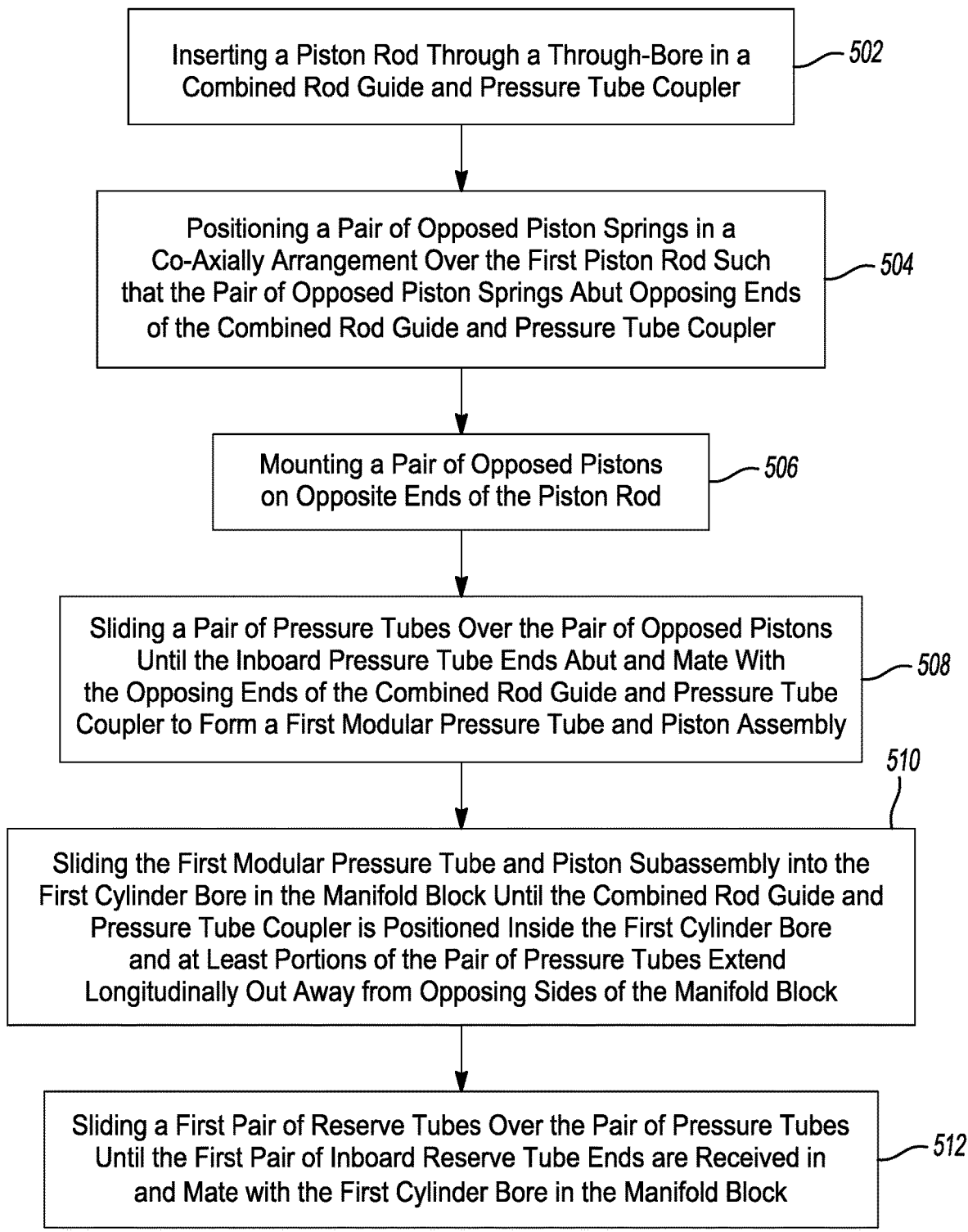
FIG. 11 is a flow chart illustrating the steps of an exemplary method of assembling the exemplary load distribution units illustrated in FIGS. 3 and 8.
Figure 12:
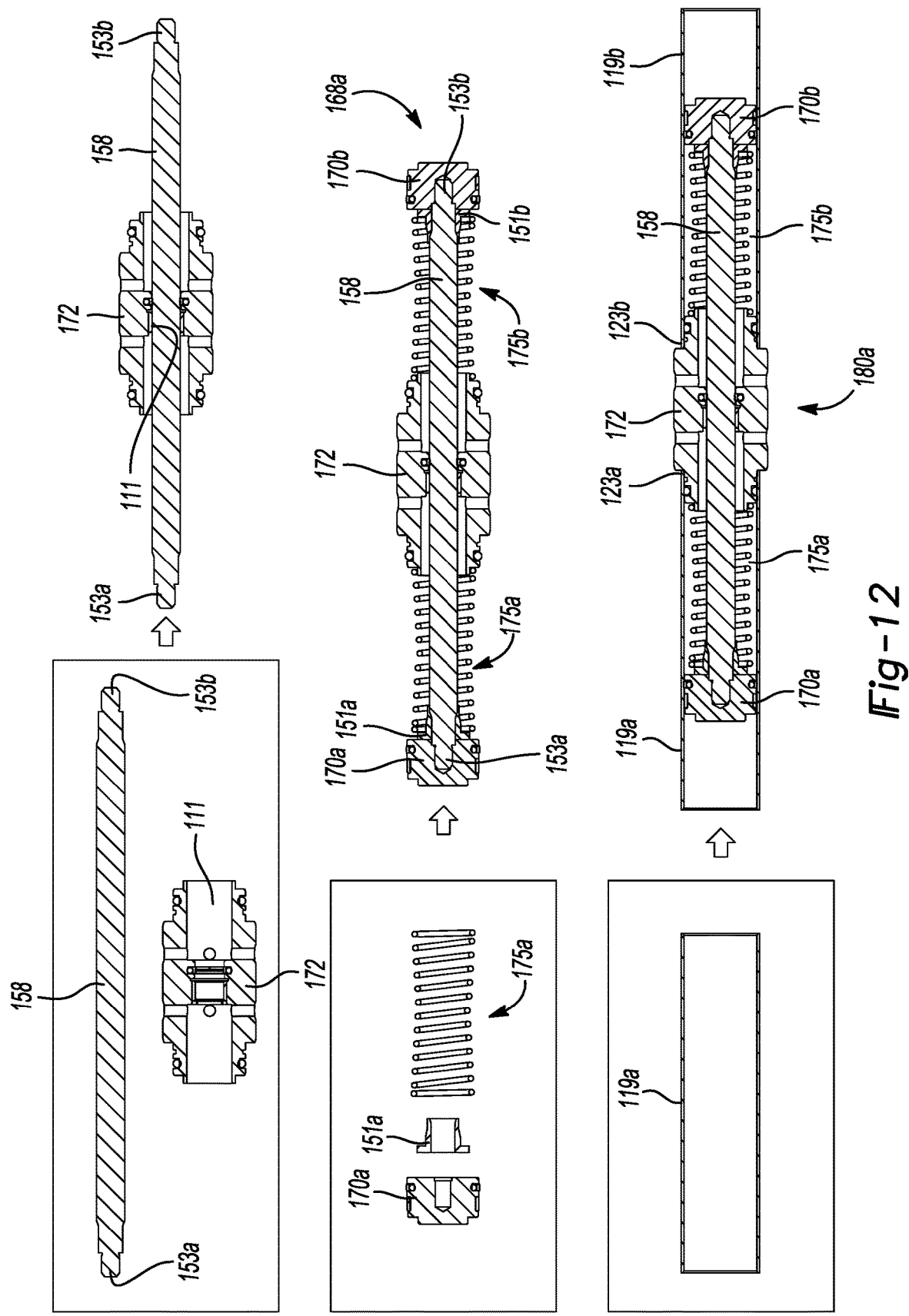
FIG. 12 is a series of top plan views illustrating an exemplary method of assembling an exemplary modular pressure tube and piston subassembly of the load distribution units illustrated in FIGS. 3 and 8.

With reference to FIGS. 11-14, a method of assembling the load distribution units 104, 404a, 404b described above is illustrated. The following description of the assembly method refers to the components of the load distribution unit 104 shown in FIGS. 1-5; however, it should be understood that the same assembly method can be used to assembly the components of the split load distribution units 404a, 404b described in FIGS. 6-10. As shown in FIGS. 11 and 12, the method generally includes step 502 of inserting a first piston rod 158 through a through-bore 111 in a integral rod guide and pressure tube coupler 172, step 504 of positioning a pair of opposed piston springs 175a, 175b in a co-axially arrangement over the first piston rod 158 such that the pair of opposed piston springs 175a, 175b abut opposing ends of the integral rod guide and pressure tube coupler 172, and step 506 of mounting a pair of opposed pistons 170a, 170b on opposite ends 153a, 153b of the first piston rod 158. The method then proceeds with step 508 of longitudinally sliding a pair of pressure tubes 119a, 119b over the pair of opposed pistons 170a, 170b until the inboard pressure tube ends 123a, 123b abut and mate with the opposing ends of the integral rod guide and pressure tube coupler 172 to form a first modular pressure tube and piston subassembly 180a. The method then proceeds to step 510 of longitudinally sliding the first modular pressure tube and piston subassembly 180a into the first cylinder bore 117a in the manifold block 115 until the integral rod guide and pressure tube coupler 172 is positioned inside the first cylinder bore 117a and makes contact with and abuts the first shoulder 198a within the first cylinder bore 117a, which provides a stop. In this position, at least portions of the pair of pressure tubes 119a, 119b extend longitudinally out away from opposing sides of the manifold block 115. The method may further comprise step 512 of longitudinally sliding the first pair of reserve tubes 131a, 131b over the pair of pressure tubes 119a, 119b until the first pair of inboard reserve tube ends 139a, 139b are received in and mate with the first cylinder bore 117a in the manifold block 115.

Figure 13:
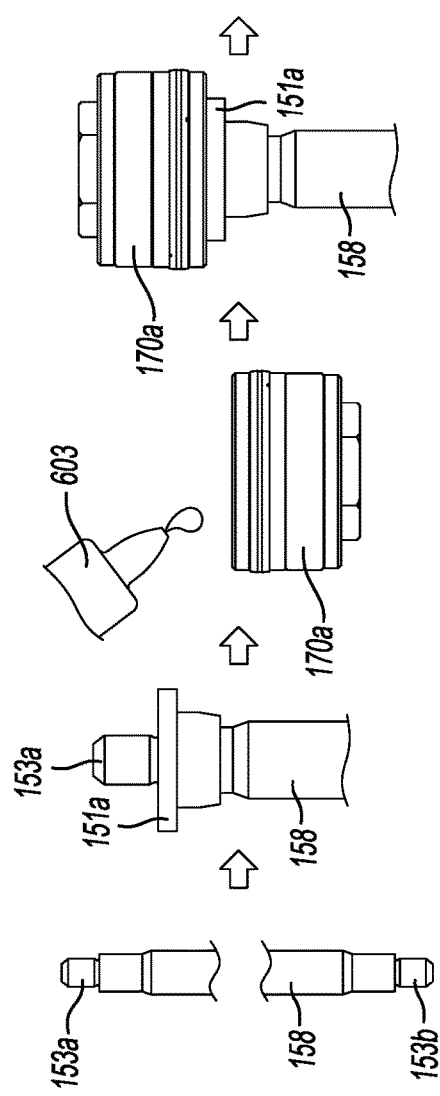
FIG. 13 is a series of top plan views illustrating an exemplary method of assembling an exemplary piston rod assembly of the load distribution units illustrated in FIGS. 3 and 8.
Figure 13:
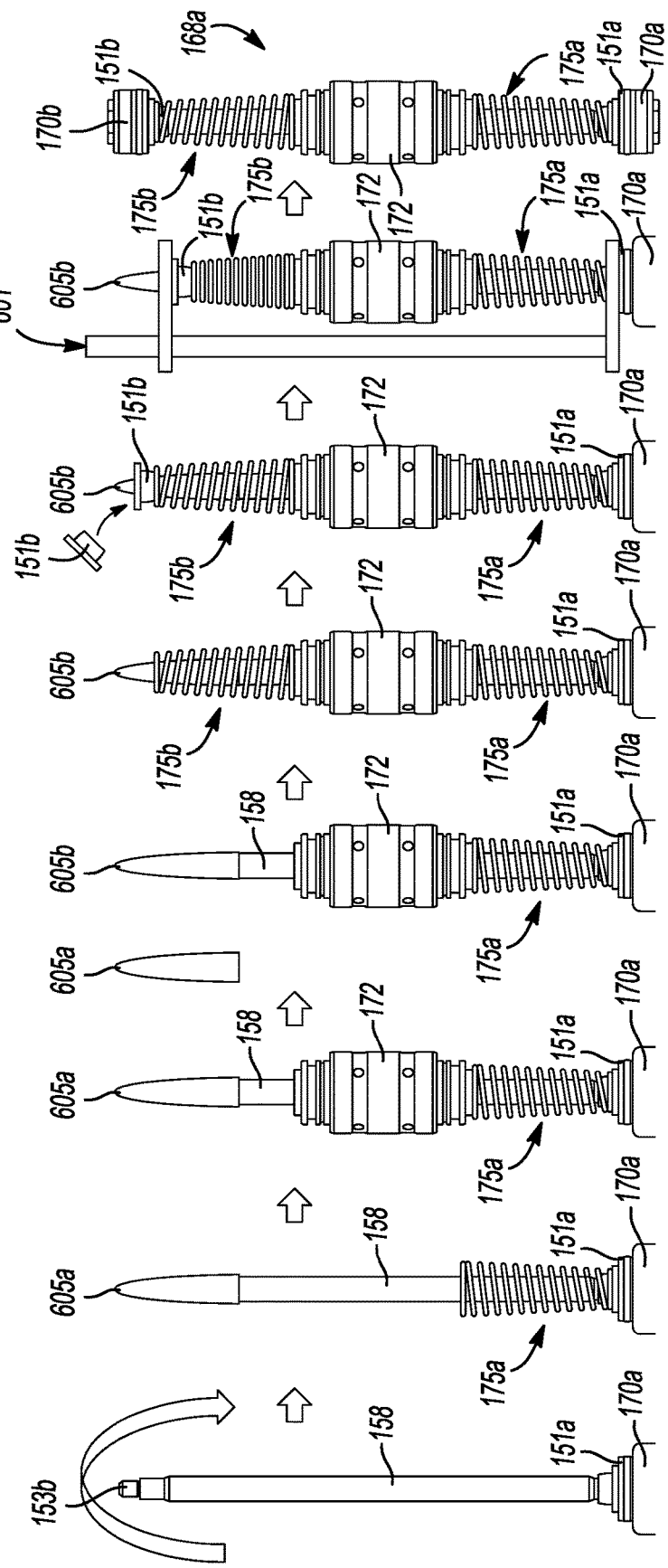

As shown in FIG. 13, steps 502-506 may be performed by first installing a first spring seat 151a on the first piston rod end 153a and then installing a first piston 170a on the first piston rod end 153a. Next, the method includes inverting the first piston rod 158 and longitudinally sliding a first opposed piston spring 175a over the second piston rod end 153b until the first opposed piston spring 175a abuts the first spring seat 151a and then longitudinally sliding the integral rod guide and pressure tube coupler 172 over the second piston rod end 153b until the integral rod guide and pressure tube coupler 172 abuts the first opposed piston spring 175a. After that, the method includes longitudinally sliding a second opposed piston spring 175b over the second piston rod end 153b until the second opposed piston spring 175b abuts the integral rod guide and pressure tube coupler 172 and then installing a second spring seat 151b on the second piston rod end 153b. Finally, steps 502-506 may be completed by compressing the first and second opposed piston springs 175a, 175b to a desired pre-load using a jig 602 and installing a second piston 170b on the second piston rod end 153b to create a first piston rod assembly 168a. A threadlock adhesive 603 may be applied to the first and second piston rod ends 153a, 153b. Optionally, the method may include installing a large diameter thread protector 605a over the second piston rod end 153b and then removing the large diameter thread protector 605a and replacing it with a smaller diameter thread protector 605b after the integral rod guide and pressure tube coupler 172 is slid over the second piston rod end 153b. The smaller diameter thread protector 605b is then removed after the second spring seat 151b is slid over the second piston rod end 153b.

Figure 14:
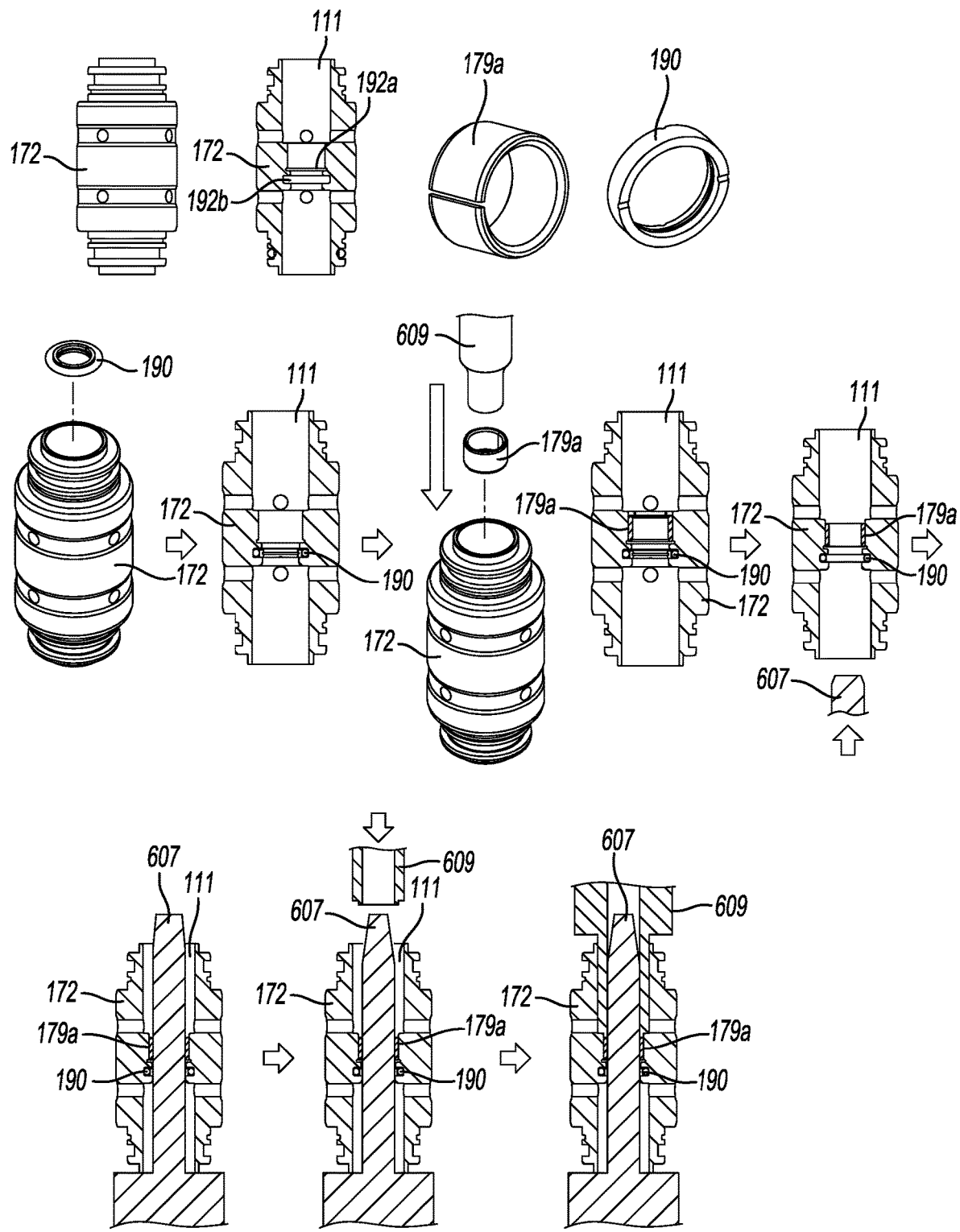
FIG. 14 is a series of top plan, perspective, and cross-sectional views illustrating an exemplary method of assembling an exemplary integral rod guide and pressure tube coupler of the load distribution units illustrated in FIGS. 3 and 8.

FIG. 14 illustrates an exemplary assembly process for installing a bearing bush 179a and seal 190 into the integral rod guide and pressure tube coupler 172. The seal 190 is first inserted into the through-bore 111 in the integral rod guide and pressure tube coupler 172 and then the bearing bush 179a is inserted into the through-bore 111 behind the seal 190. The integral rod guide and pressure tube coupler 172 is then placed on a mandrel 607 such that the mandrel 607 is received in and extends through the through-bore 111 in the integral rod guide and pressure tube coupler 172. A tubular press 609 is then inserted into the through-bore 111 of the integral rod guide and pressure tube coupler 172 from the opposite side as the mandrel 607 and is advanced into the through-bore 111 until the tubular press 609 slides over the mandrel 607 and presses the seal 190 and the bearing bush 179a into respective grooves 192a, 192b in the through-bore 111 of the integral rod guide and pressure tube coupler 172. The tubular press 609 is then removed from the through-bore 111 of the integral rod guide and pressure tube coupler 172 and the integral rod guide and pressure tube coupler 172 is then removed from the mandrel 607 and is ready for installation over a first piston rod 158.

The method may include repeating the steps described above, including steps 502-508 and those shown in FIGS. 13 and 14, a second time to form a second modular pressure tube and piston subassembly 180b, as shown in FIG. 5. Once the second modular pressure tube and piston subassembly 180b is created, the method may proceed with repeating step 510, but this time longitudinally sliding the second modular pressure tube and piston subassembly 180b into the second cylinder bore 117b in the manifold block 115 until the integral rod guide and pressure tube coupler 173 of the second modular pressure tube and piston subassembly 180b is positioned inside the second cylinder bore 117b and makes contact with and abuts the second shoulder 198b within the second cylinder bore 117b, which provides a stop. In this position, at least portions of the pair of pressure tubes 121a, 121b of the second modular pressure tube and piston subassembly 180b extend longitudinally out away from the opposing sides of the manifold block 115. The method may then proceed with repeating step 512, but this time longitudinally sliding the second pair of reserve tubes 135a, 135b over the pair of pressure tubes 121a, 121b until the second pair of inboard reserve tube ends 143a, 143b are received in and mate with the second cylinder bore 117b in the manifold block 115.

Many other modifications and variations of the present disclosure are possible in light of the above teachings and may be practiced otherwise than as specifically described while within the scope of the appended claims.

What is claimed is:

1. A suspension system, comprising:
a plurality of dampers including a front left damper with a first compression chamber and a first rebound chamber, a front right damper with a second compression chamber and a second rebound chamber, a back left damper with a third compression chamber and a third rebound chamber, and a back right damper with a fourth compression chamber and a fourth rebound chamber;
a plurality of hydraulic circuits including a first hydraulic circuit that extends between and fluidly connects said first compression chamber of said front left damper and said fourth rebound chamber of said back right damper, a second hydraulic circuit that extends between and fluidly connects said second compression chamber of said front right damper and said third rebound chamber of said back left damper, a third hydraulic circuit that extends between and fluidly connects said first rebound chamber of said front left damper and said fourth compression chamber of said back right damper, and a fourth hydraulic circuit that extends between and fluidly connects said second rebound chamber of said front right damper and said third compression chamber of said back left damper;
at least one load distribution unit arranged in fluid communication with at least two hydraulic circuits in said plurality of hydraulic circuits;
said load distribution unit including a manifold block with a first cylinder bore, a first pair of pressure tubes that are at least partially received in said first cylinder bore on opposing sides of said manifold block to define a first pair of opposed cylinders, a first piston rod assembly with a first piston rod and a first pair of opposed pistons that are mounted on said first piston rod and are slidingly received within said first pair of opposed cylinders, and a first integral rod guide and pressure tube coupler that is received in said first cylinder bore in said manifold block and includes a first through-bore; and
said first pair of pressure tubes extending longitudinally between a first pair of inboard pressure tube ends and a first pair of outboard pressure tube ends,
wherein said first piston rod extends through said first through-bore in said first integral rod guide and pressure tube coupler in a sliding fit and said first pair of inboard pressure tube ends are received in said first cylinder bore and are retained on opposing ends of said first integral rod guide and pressure tube coupler.

2. The suspension system as set forth in claim 1, wherein said first piston rod assembly includes a first pair of opposed piston springs that are co-axially arranged about said first piston rod and extend radially outward from said opposing ends of said first integral rod guide and pressure tube coupler to said first pair of opposed pistons to bias said first piston rod to a centered position where said first pair of opposed pistons are equidistant from said opposing ends of said first integral rod guide and pressure tube coupler.

3. The suspension system as set forth in claim 2, wherein said load distribution unit further includes a first pair of reserve tubes that are at least partially received in said first cylinder bore on opposing sides of said manifold block and are arranged annularly about said first pair of pressure tubes to define a first pair of reservoir chambers between said first pair of pressure tubes and said first pair of reserve tubes.

4. The suspension system as set forth in claim 3, wherein said load distribution unit includes a second cylinder bore in said manifold block, a second pair of pressure tubes that are at least partially received in said second cylinder bore on opposing sides of said manifold block to define a second pair of opposed cylinders, a second piston rod assembly with a second piston rod and a second pair of opposed pistons that are mounted on said second piston rod and are slidingly received within said second pair of opposed cylinders, and a second integral rod guide and pressure tube coupler that is received in said second cylinder bore in said manifold block and includes a second through-bore, wherein said second pair of pressure tubes extend longitudinally between a second pair of inboard pressure tube ends and a second pair of outboard pressure tube ends, wherein said second piston rod extends through said second through-bore in said second integral rod guide and pressure tube coupler in a sliding fit, and wherein said second pair of inboard pressure tube ends are received in said second cylinder bore and are retained on opposing ends of said second integral rod guide and pressure tube coupler.

5. The suspension system as set forth in claim 4, wherein said second piston rod assembly includes a second pair of opposed piston springs that are co-axially arranged about said second piston rod and extend radially outward from said opposing ends of said second integral rod guide and pressure tube coupler to said second pair of opposed pistons to bias said second piston rod to a centered position where said second pair of opposed pistons are equidistant from said opposing ends of said second integral rod guide and pressure tube coupler.

6. The suspension system as set forth in claim 5, wherein said load distribution unit further includes a second pair of reserve tubes that are at least partially received in said second cylinder bore on opposing sides of said manifold block and are arranged annularly about said second pair of pressure tubes to define a second pair of reservoir chambers between said second pair of pressure tubes and said second pair of reserve tubes.

7. The suspension system as set forth in claim 4, wherein said first and second piston rods extend through said manifold block in a parallel and spaced apart arrangement.

8. The suspension system as set forth in claim 1, wherein said at least one load distribution unit includes a pair of split load distribution units of identical construction that are positioned end-to-end between said front left and front right dampers or between said back left and back right dampers.

9. A load distribution unit for regulating hydraulic pressure within a suspension system, comprising:
  a manifold block with a first cylinder bore that extends longitudinally through said manifold block;
  a first pair of pressure tubes that are at least partially received in said first cylinder bore on opposing sides of said manifold block to define a first pair of opposed cylinders, said first pair of pressure tubes extending longitudinally between a first pair of inboard pressure tube ends and a first pair of outboard pressure tube ends;
  a first piston rod assembly with a first piston rod and a first pair of opposed pistons that are mounted on said first piston rod and are slidingly received within said first pair of opposed cylinders; and
  a first integral rod guide and pressure tube coupler that is received in said first cylinder bore in said manifold block and includes a first through-bore,
  wherein said first piston rod extends through said first through-bore in said first integral rod guide and pressure tube coupler in a sliding fit and said first pair of inboard pressure tube ends are received in said first cylinder bore and are retained on opposing ends of said first integral rod guide and pressure tube coupler.

10. The load distribution unit as set forth in claim 9, wherein each of said opposing ends of the said first integral rod guide and pressure tube coupler includes a boss having a reduced diameter and said first pair of inboard pressure tube ends are slid over and retained on each of said bosses on said opposing ends of said first integral rod guide and pressure tube coupler such that said first integral rod guide and pressure tube coupler assembly and said first pair of pressure tubes are held together as a first modular pressure tube and piston subassembly.

11. The load distribution unit as set forth in claim 10, wherein said load distribution unit further includes a first pair of reserve tubes that are at least partially received in said first cylinder bore on opposing sides of said manifold block and are arranged annularly about said first pair of pressure tubes to define a first pair of reservoir chambers between said first pair of pressure tubes and said first pair of reserve tubes.

12. The load distribution unit as set forth in claim 11, wherein said first pair of reserve tubes extend longitudinally between a first pair of inboard reserve tube ends and a first pair of outboard pressure tube ends and wherein said first cylinder bore in said manifold block includes a first pair of counterbores of increased diameter and said first pair of inboard reserve tube ends are received in said first pair of counterbores in said manifold block.

13. The load distribution unit as set forth in claim 12, wherein said first pair of inboard pressure tube ends and said first pair of outboard pressure tube ends are constructed as open tube ends, wherein said first pair of inboard reserve tube ends are constructed as open tube ends, and said first pair of outboard reserve tube ends are constructed as closed tube ends.

14. The load distribution unit as set forth in claim 10, wherein said first piston rod assembly includes a first pair of opposed piston springs that are co-axially arranged about said first piston rod and extend radially outward from said opposing ends of said first integral rod guide and pressure tube coupler to said first pair of opposed pistons to bias said first piston rod to a centered position where said first pair of opposed pistons are equidistant from said opposing ends of said first integral rod guide and pressure tube coupler.

15. The load distribution unit as set forth in claim 9, wherein said manifold block includes a second cylinder bore, a second pair of pressure tubes that are at least partially received in said second cylinder bore on opposing sides of said manifold block to define a second pair of opposed cylinders, a second piston rod assembly with a second piston rod and a second pair of opposed pistons that are mounted on said second piston rod and are slidingly received within said second pair of opposed cylinders, and a second integral rod guide and pressure tube coupler that is received in said second cylinder bore in said manifold block and includes a second through-bore, wherein said second pair of pressure tubes extend longitudinally between a second pair of inboard pressure tube ends and a second pair of outboard pressure tube ends, wherein said second piston rod extends through said second through-bore in said second integral rod guide and pressure tube coupler in a sliding fit, and wherein said second pair of inboard pressure tube ends are received in said second cylinder bore and are retained on opposing ends of said second integral rod guide and pressure tube coupler.

16. A method of assembling a load distribution unit of a suspension system, the method comprising the steps of:
   inserting a piston rod through a through-bore in an integral rod guide and pressure tube coupler;
   positioning a pair of opposed piston springs in a co-axial arrangement over the first piston rod such that the pair of opposed piston springs abut opposing ends of the integral rod guide and pressure tube coupler;
   mounting a pair of opposed pistons on opposite ends of the piston rod;
   longitudinally sliding a pair of pressure tubes that extend longitudinally between a pair of inboard pressure tube ends and a pair of outboard pressure tube ends over the pair of opposed pistons until the inboard pressure tube ends abut and mate with the opposing ends of the integral rod guide and pressure tube coupler to form a first modular pressure tube and piston subassembly; and
   longitudinally sliding the first modular pressure tube and piston subassembly into a first cylinder bore in a manifold block until the integral rod guide and pressure tube coupler is positioned inside the first cylinder bore and at least portions of the pair of pressure tubes extend longitudinally out away from opposing sides of the manifold block.

17. The method as set forth in claim 16, further comprising the step of:
   longitudinally sliding a first pair of reserve tubes that extend longitudinally between a first pair of inboard reserve tube ends and a first pair of outboard reserve tube ends over the pair of pressure tubes until the first pair of inboard reserve tube ends are received in and mate with the first cylinder bore in the manifold block.

18. The method as set forth in claim 17, wherein the method includes repeating the steps of the method a second time to form a second modular pressure tube and piston subassembly and wherein the method further comprises the steps of:
   longitudinally sliding the second modular pressure tube and piston subassembly into a second cylinder bore in the manifold block until the integral rod guide and pressure tube coupler of the second modular pressure tube and piston subassembly is positioned inside the second cylinder bore and at least portions of the pair of pressure tubes of the second modular pressure tube and piston subassembly extend longitudinally out away from the opposing sides of the manifold block; and
   longitudinally sliding a second pair of reserve tubes that extend longitudinally between a second pair of inboard reserve tube ends and a second pair of outboard reserve tube ends over the pair of pressure tubes of the second modular pressure tube and piston subassembly until the second pair of inboard reserve tube ends are received in and mate with the second cylinder bore in the manifold block.

19. The method as set forth in claim 18, wherein the first modular pressure tube and piston subassembly and the second modular pressure tube and piston subassembly are positioned in a parallel and spaced apart arrangement.

20. The method as set forth in claim 16, wherein the steps of:
   inserting the piston rod through the through-bore in the integral rod guide and pressure tube coupler, positioning the pair of opposed piston springs in a co-axial arrangement over the first piston rod such that the pair of opposed piston springs abut the opposing ends of the integral rod guide and pressure tube coupler, and mounting the pair of opposed pistons on opposite ends of the piston rod are carried out by performing the following steps in sequential order:
   installing a first spring seat on a first piston rod end;
   installing a first piston on the first piston rod end;
   longitudinally sliding a first spring over a second piston rod end until the first spring abuts the first spring seat;
   longitudinally sliding the integral rod guide and pressure tube coupler over the second piston rod end until the integral rod guide and pressure tube coupler abuts the first spring;
   longitudinally sliding a second spring over the second piston rod end until the second spring abuts the integral rod guide and pressure tube coupler;
   installing a second spring seat on the second piston rod end;
   compressing the first and second springs to a desired pre-load using a jig; and
   installing a second piston on the second piston rod end.

* * * * *